(12) United States Patent
Friedland et al.

(10) Patent No.: US 6,449,601 B1
(45) Date of Patent: Sep. 10, 2002

(54) DISTRIBUTED LIVE AUCTION

(75) Inventors: Noah S. Friedland, Seattle, WA (US); Sky T. Kruse, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/231,127

(22) Filed: Dec. 30, 1998

(51) Int. Cl.[7] .............................................. G06F 17/00
(52) U.S. Cl. ....................................................... 705/37
(58) Field of Search ..................... 705/80, 37

(56) References Cited

U.S. PATENT DOCUMENTS

| | | | |
|---|---|---|---|
| 4,789,928 A | * 12/1988 | Fujisaki | ...................... 364/401 |
| 5,077,665 A | 12/1991 | Silverman et al. | |
| 5,640,569 A | * 6/1997 | Miller et al. | ................... 705/37 |
| 5,684,863 A | 11/1997 | Katz | |
| 5,696,901 A | * 12/1997 | Konrad | ...................... 709/203 |
| 5,794,207 A | * 8/1998 | Walker et al. | ................. 705/23 |
| 5,794,219 A | 8/1998 | Brown | |
| 5,818,914 A | 10/1998 | Fujisaki | |
| 5,835,896 A | 11/1998 | Fisher et al. | |
| 5,845,265 A | * 12/1998 | Woolston | ...................... 705/37 |
| 5,873,071 A | * 2/1999 | Ferstenberg et al. | .......... 705/37 |
| 5,890,138 A | 3/1999 | Godin et al. | |
| 5,905,975 A | 5/1999 | Ausubel | |
| 6,012,045 A | * 1/2000 | Barzilai et al. | ................ 705/37 |
| 6,018,721 A | * 1/2000 | Aziz et al. | ..................... 705/35 |
| 6,023,686 A | * 2/2000 | Brown | ......................... 705/37 |
| 6,058,379 A | * 5/2000 | Odom et al. | ................... 705/37 |

FOREIGN PATENT DOCUMENTS

| | | | |
|---|---|---|---|
| EP | 0628920 | * | 12/1994 |
| EP | 0 716 386 | | 6/1996 |
| EP | 0828223 | * | 9/1996 |
| JP | 02000113070 A | * | 4/2000 |
| WO | WO/98/34187 | | 8/1998 |
| WO | WO99/63461 | * | 12/1999 ........... G06F/17/60 |

OTHER PUBLICATIONS

"Cyberauctions: Going Once, going twice . . . ", Interactive Marketing News, v2, n13, pp. 1–2., Dialog File 636, Access #02771147, Jun. 1995.*
"Moai Technologies Announces LiveExchange 2.1", PR Newswire, pp. 1–2., Dialog, File 20, Access #02803594, Sep. 1998.*
"Bid.com Announces www.dutchauction.com", Business Wire, pp. 1–2, Dialog, File 16, Access #05914806, Oct. 1998.*
Dunlap, Charlotte , "going once, going twice . . . sold!", Computer Reseller News, pp. 1–2, Dialog, File 15, Access #01544740, Dec. 1997.*
"Auction Universe Expands to Bring Thousands More Auctioneers online", PR Newswire, pp. 1–2, Dialog, 16, Access #05889248, Oct. 1998.*
Cooper, Janine, Going going gone! Tradition gives way to technology. (Sotheby's and interactive television), Mar. 1990.*

(List continued on next page.)

Primary Examiner—James P. Trammell
Assistant Examiner—Pierre E. Elisca
(74) Attorney, Agent, or Firm—Knobbe, Martens, Olson & Bear LLP

(57) ABSTRACT

A method for distributing a live auction over the Internet to remote bidders. A human proxy attends the live auction in order to monitor the auction and compose status updates that are distributed to remote bidders via the Internet in real time to allow the remote bidders to follow the auction. Remote bidders may place bids for items that are transmitted via the Internet to the human proxy, who may then submit the bids to the auctioneer, components that facilitate distribution of the live auction over the Internet include: an auction console, an auction sever, collector/redistributor nodes, and client programs.

11 Claims, 22 Drawing Sheets

OTHER PUBLICATIONS

"Auction house moves for Internet business", Internet Business News, p. 1, Dialog File 636, Access #02809791, Aug. 1995.*

"Insurance Auto Auctions, Inc. Unveils Internet auction for salvage vehicles", PR Newswire, pp. 1–2, Dialog 621, Access #02087129, Jan. 2000.*

"UK's auction channel uses interactive voice technology", Newsbytes, pp. 1–2, Dialog, File 636, Access #03768081, Dec. 1997.*

"LiveBid.com sells entire historic town over the Internet", Business Wire, p. 1, Dialog File 16, Access No. 0587175, Sep. 1998.*

Innerlinx Technologies selected to present LiveBid.com at Red Herring Forum, PR Newswire, p. 1, Dialog File 148, Access No. 10178492, May 1998.*

Derwent–ACC–NO: 2000–431419; Handler B. A. ; Jun. 2000.*

C. Priest and M. Van Tol, "Adaptive Agents in a Persistent Shout Double Auction," ACM Digital Library, pp. 11–18, (Oct. 1998).

* cited by examiner

FIG. 9

LIVE BID.com — 904, 902

PRODUCT NAME: SS PECK BOAT MODEL
LOT NUMBER: 4
LEADING BIDDER: MONEYBAGS
LEADING BIDDER ID: 253
CURRENT FLASH TEXT: IT'S THE RIGHT COLOR!
CURRENT STATUS: SOLD
PADDLE#: 1012

— 910, 914, 918

| FAIR WARNING | LAST CHANCE |
| --- | --- |
| SOLD | PASS |
| SOLD LOCAL | NEXT ITEM |

— 908, 912, 916

SUBMIT

2500 | 2500

906:
1, 2.5, 5, 10, 25, 50, 100, 250, 500, 1000, 2500, 5000
1, 2.5, 5, 10, 25, 50, 100, 250, 500, 1000, 2500, 5000
1, 2.5, 5, 10, 25, 50, 100, 250, 500, 1000, 2500, 5000
○1 ○2.5 ○5 ○10 ○25 ○50 ○100 ○250 ○500 ○1000 ○2500 ○5000

922 →
○ ALL THE OPTIONS!
○ BETTER THAN MONEY IN THE BANK!
○ BUY AN INVESTMENT TODAY!
○ FUN IN THE SUN!
○ HARD TO FIND THESE DAYS!
○ IT'S FOR SALE - NO RESERVE!
○ IT'S THE RIGHT COLOR!
○ IT'S WORTH MUCH MORE!
○ ONE OF A KIND!
○ SOLD ON THE FLOOR!
○ THE AIR BLOWS COLD!
○ THE RESERVE IS OFF, WE'RE SELLING IT TODAY!
○ WHAT A DEAL, WHAT A STEAL!
○ WHAT A SPECTACULAR PIECE OF ART!
○ YOU CAN'T PAY TOO MUCH FOR PERFECTION!

920 — ENTER LOT NUMBER TO JUMP TO:

924 — OR ENTER YOUR OWN MESSAGE:

DISTRIBUTED LIVE AUCTION

TECHNICAL FIELD

The present invention relates to the distribution of live auctions over a communications medium to remote bidders, and, in particular, to a method for efficiently monitoring a live auction, distributing real-time information concerning the live auction to remote bidders, and collecting bids from remote users and submitting the collected bids at the live auction.

BACKGROUND OF THE INVENTION

During the past five years, the Internet has blossomed from a medium for simple data exchange and messaging to the fastest growing, most innovative medium for information exchange and commerce. Virtual shopping malls, buying services, and other types of Internet-based retailing methods are being employed by an ever increasing number of retail merchants. In addition, a number of organizations, including eBay™, provide Internet-based auctions. Sellers of goods and services register those goods and services with the auction organization, and the auction organization then provides information over the Internet about the goods and services to potential bidders. A bidder may submit a bid via the Internet for a particular good or service to the auction organization. The auction organization collects bids over a period of time, after which the auction organization notifies the highest bidder that the highest bidder has submitted the winning bid, notifies the seller of the identity of the winning bidder, and provides for an exchange of information between the seller and the winning bidder for execution of the transaction. This type of auction is known as a "silent auction."

With the rapid rise in popularity of Internet commerce and information services, and the rapid evolution of computer and communications technologies, great strides have been made in improving the timeliness, quality, quantity, and, perhaps most importantly, the types of information that can be exchanged through the Internet. Whereas ten years ago, the Internet was primarily used for file transfer and exchange of text-based messages, today the Internet is routinely used for distributing elaborate, interactive, real-time graphical displays, real-time audio, and real-time video. These technological improvements greatly increase the user appeal of Internet-based silent auctions. The technological innovations also provide a basis for more interesting and more interactive Internet-based auction models. For example, it would be desirable to conduct live auctions over the Internet Distribution of a real-time, live auction is far more complex and technologically demanding than carrying out a silent auction over the Internet. Real-time live auctions are generally conducted by auctioneers in front of a live audience. Auctions are fast-paced, and bids may be submitted by very concise gestures or vocal signals. The auction of a single item may transpire in a very short interval of time, often as brief as ten seconds. Thus, real-time, live auctions require careful and quick monitoring and interaction with the auction process.

Real-time, live auctions comprise the auctioning of a sequence of lots. A lot may be a simple lot, composed of single good or service, or a choice or quantity lot, comprising a collection of goods and services that are auctioned together. Generally, a sequential inventory of the lots to be auctioned is prepared in advance and distributed to potential bidders in the form of a catalogue. However, the auctioneer generally has the discretion to change the sequence of lots during the auction, divide choice or quantity lots into smaller lots, or coalesce smaller lots into larger lots. Thus, during a live auction event, a bidder must monitor and quickly bid on a desired lot, while simultaneously tracking any changes in the sequence or groupings of goods and services offered.

There are a number of different types of auction styles. Yankee auctions begin with a low asking price, which is increased during the auction with each successful bid. Dutch auctions, by contrast, start with a high price that is decreased incrementally by the auctioneer until the auctioneer obtains a first, winning bid.

There are different types of lots, as mentioned above. Choice lots include a collection of goods or services. The auctioneer initiates bidding on a choice lot on a per-item price basis, eventually establishing a price point. The high bidder may select which items he or she wants from the inventory at that price point. The auctioneer offers the remaining inventory to the floor at the price-point value. If any items in the lot remain unsold, the auctioneer has the option of re-initiating bidding on a new lot comprising the unsold items, or passing and moving on to the next lot. Quantity lots comprise many identical items. As with choice lots, quantity lots involve establishing price points, although these price points typically have minimum quantities associated with them. The auctioneer first establishes a minimum quantity for a quantity lot, and then initiates bidding to establish a per-item price point. The high bidder may select the minimum quantity or may select more items at that price point. The auctioneer offers the remaining inventory to the floor at that minimum quantity and price point. If any inventory remains, the auctioneer establishes a new minimum quantity for the quantity lot, and then again initiates bidding to establish a per-item price point. The price points in quantity lots typically decrease as the minimum quantity constraint increases, allowing the auctioneer to sell small numbers of units at retail-lie values and large numbers of units at wholesale-like values within the same lot. A particular advantage to distributing a live auction over a communications medium, such as the Internet, is that, by bringing many thousands of Internet bidders to the auction, virtual bidders can have a huge impact on quantity lot pricing, with a far greater percentage of the inventory bid for and sold at retail-like values than at a conventional live event.

Real-time, live auctions have far greater entertainment value, and may be more efficient in time, than the silent auctions currently conducted over the Internet. However, for real-time, live auctions to be distributed over the Internet, Internet-based solutions and methodologies must be devised to overcome the many complex problems associated with real-time, live auctions. In particular, an Internet-based facility for distribution of real-time, live auctions to remote bidders over the Internet, or a similar communications medium, must address the following problems: (1) a need for real-time monitoring and interaction with the auctioneer and auction audience; (2) a need for rapidly disseminating status information from the live auction, in real-time, to remote bidders; (3) a need for rapidly and efficiently collecting bids from remote bidders and presenting those bids to the auctioneer; (4) a need for authorizing and verifying remote bidders' identities; and (5) a need for quickly determining any changes in the sequence of lots and lot assignments that occur during the course of a live auction and distributing information about the changes to remote bidders.

SUMMARY OF THE INVENTION

The present invention relates to the distribution of real-time, live auctions, conducted by a live auctioneer in the presence of an audience of bidders, to remote bidders via the Internet. The invention consists of four primary modules: a client program running on a remote computer, a network of collector/redistributor nodes running on the broadcaster's enterprise backbone, an auction server process associated with a database where auction state and persistent data are stored, and an auction console that resides at the site of the live event, allowing a proxy to introduce remote bids on the floor and report status back to the remote audience.

Each remote bidder interacts with a client program running on a remote computer. The client program allows the remote bidder to log into a distributed live auction ("DLA") system in order to register as a remote bidder for a particular live auction. At the time that the live auction is conducted, the remote bidder interacts with the client program on the remote computer in order to follow the course of the real-time, live auction, and to submit bids. The remote bidder receives status updates concerning the bidding, lot state, and lot sequencing from the live auction via a graphical user interface provided on the remote computer by the client program, and may interact with the graphical user interface in order to submit bids for a particular lot.

The collector/redistributor nodes are heirarchically interconnected and serve to efficently collect and filter bids from a large number of remote bidders and pass potentially winning bids onto the auction server, and also serve to effeciently broadcast status messages concerning the live auction received from the auction server to a large number of remote client programs running on remote computers.

The auction server is a centralized connection point that interconnects collector/redistributor nodes, on-site auction consoles, and a database that computationally mirrors the states of one or more live auctions and that stores detailed information about both on-going and upcoming auctions. The auction server is the focal point for collecting bids from remote bidders and for distributing status information about one or more concurrent live auctions to remote bidders. Moreover, the auction server manages extensive information about current and future auctions, including detailed inventory lists and lot assignments. The auction server is directly connected to root-level collector/redistributor nodes and is also connected, via the Internet, to one or more auction consoles.

The auction console is a program running on a computer, often a laptop computer, that interacts with a human proxy in the audience of the live auction. The human proxy is notified of bids from remote bidders via the auction console program and may submit bids to the auctioneer during the auction process. The human proxy monitors the auction, reports changes in the state, such as successful bids or sales, as well as changes in the lot sequence or assignments via the auction console program to the auction server.

The DLA solves the problems associated with distributing a real-time, live auction using a combination of technologies, communications protocols, software programs, human proxies, centralized databases, and auction management methodologies. In particular, the human proxy is able to monitor and interact with the auction process in real-time, as well as monitor and report changes in lot sequences and assignments. The DLA architecture provides an efficient extremely fast medium for distributing status information about an auction to a large number of remote bidders and for collecting bids from remote bidders and presenting them to the auctioneer. The present invention thus provides a method for bringing the excitement and time efficiency of a live auction to remote bidders over the Internet.

BRIEF DESCRIPTION OF THE DRAWINGS

FIG. 9 is a representation of the graphical user interface displayed to the DLA human proxy by the DLA auction console program.

DETAILED DESCRIPTION OF THE INVENTION

The present invention will be described in three subsections that follow. In the first subsection, state transition diagrams are used to illustrate and contrast the silent auction model and the real-time, live auction model. The overall architecture of the Internet-enabled Distributed Live Auction ("DLA") system is also presented in the first subsection. In the second subsection, the user interface provided to a remote bidder by the DLA is described, along with descriptions of messages passed between the client program and the DLA. In the third subsection, four basic types of components of the DLA are described using both block diagrams and flow control diagrams.

Auction State Diagrams and DLA Architecture

Figure 1:
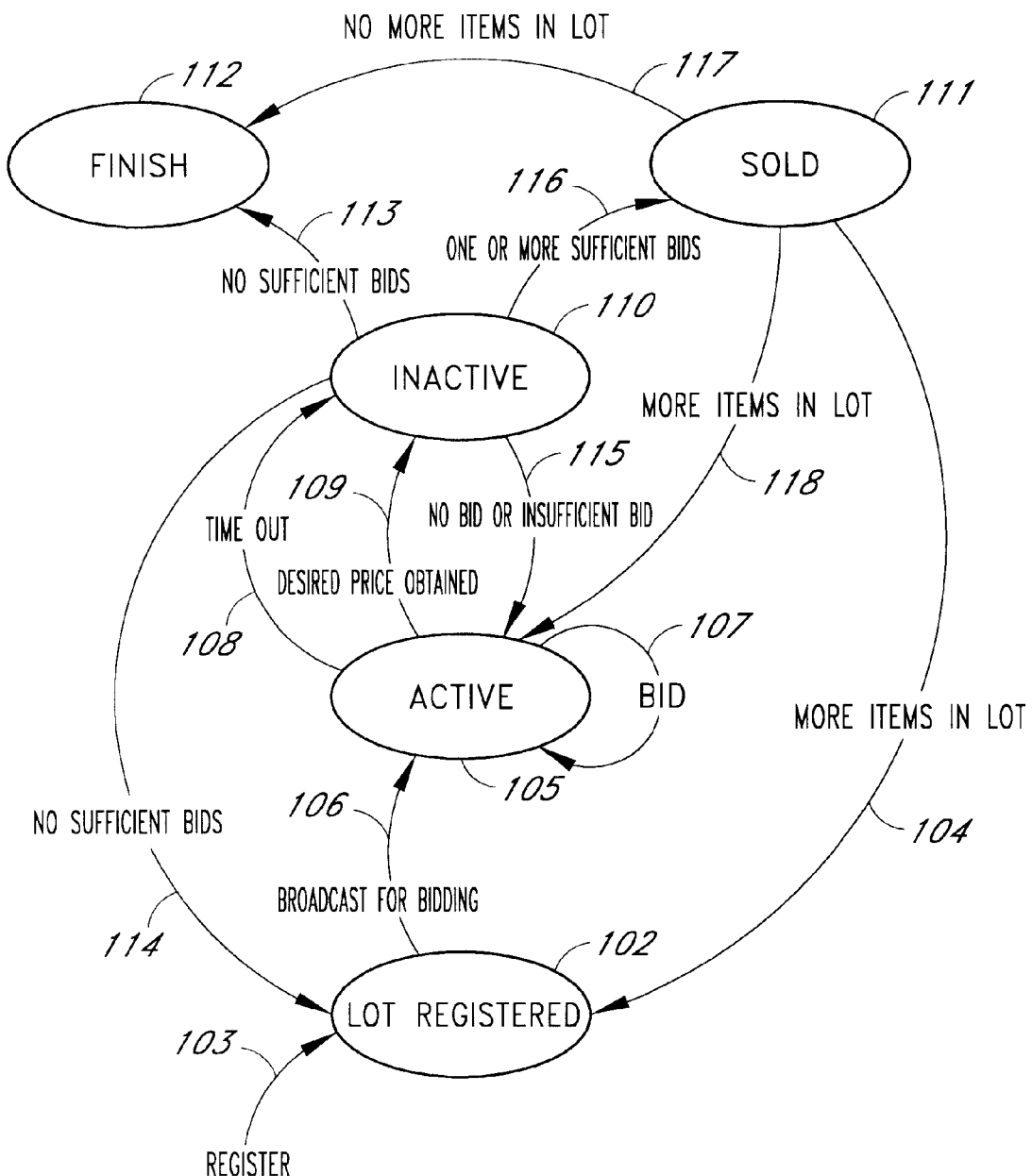
FIGS. 1–2 are state transition diagrams illustrating a silent auction and a real-time, live auction, respectively.
Figure 2:
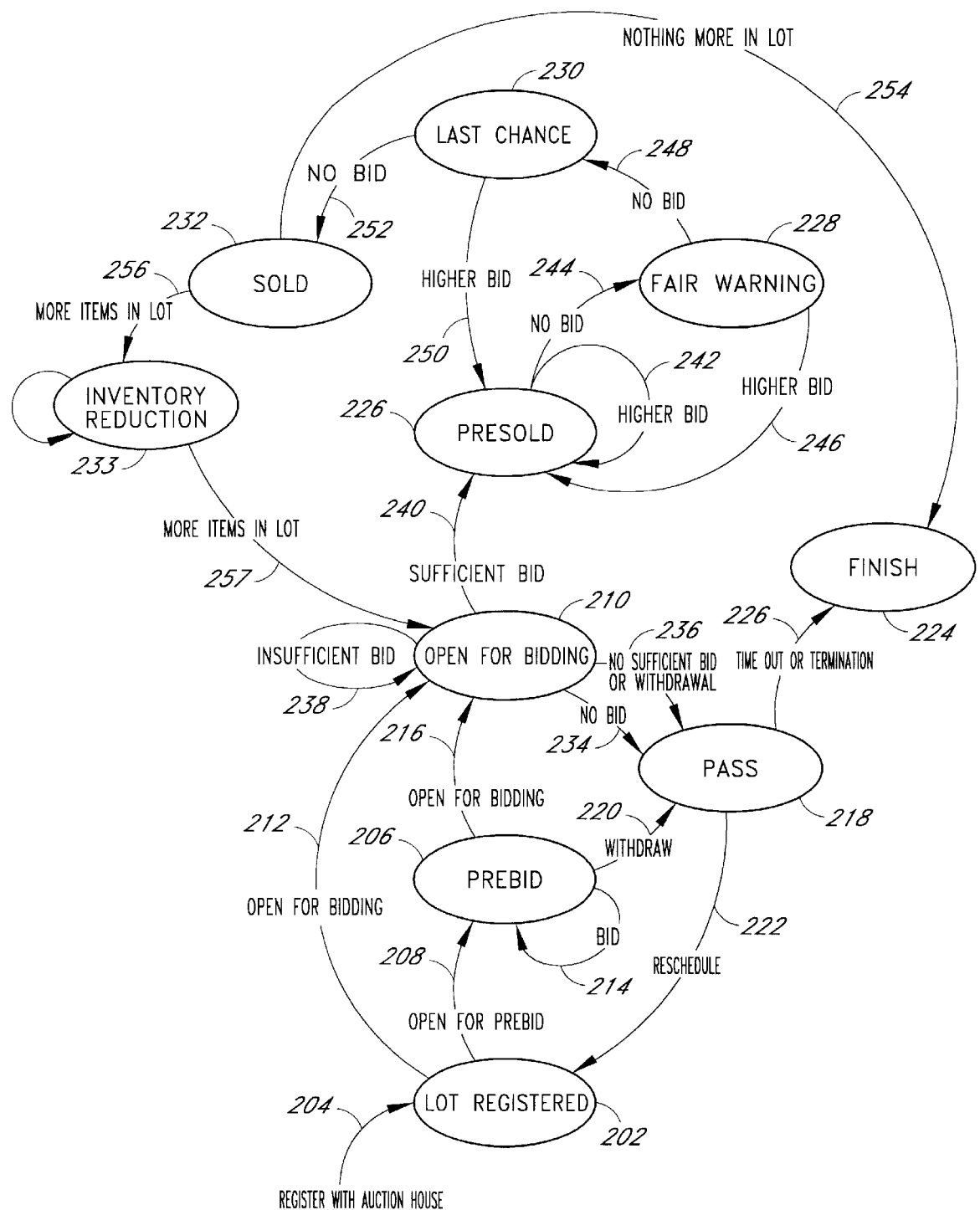

FIGS. 1–2 are state transition diagram illustrating a silent auction and a real-time, live auction, respectively. In FIGS.

1 and 2, states are represented by labeled ovals, such labeled oval 102 in FIG. 1, and state transitions are represented by directed line segments, such as directed line segment 104 in FIG. 1. In both FIGS. 1 and FIG. 2, state transition diagram for the registration and auctioning of a single lot are shown.

In FIG. 1, a lot enters the "lot registered" state 102 through a registration transition 103. The lot may be registered by a seller through an interactive Internet-based web page, by mail, by telephone, or by some other communications means. A lot transitions, via transition 106, from the lot registered state 102 to the state is active 105 when the silent auction organization broadcasts, or makes available, the lot for bidding. While in the active state, bids may be submitted for the lot by remote bidders via transition 107. In FIG. 1, two different transitions 108–109 are shown leading from the active state 105 to the inactive state 110. A transition from the active state to the inactive state may occur upon the expiration of a defined bidding period or, in other words, via a timeout 108. Under some silent auction models, other transitions from the active state 105 to the inactive state 110 may be possible, including receipt of a bid that meets some desired price via transition 109. From the inactive state, transitions lead to the active state 105, the state "sold" 111, the state "finish" 112, and the lot registered state 102. If no bids that meet some minimum price are received while the lot is in the active state 105, then, following transition to the inactive state 110, the lot may transition to the finish state via transition 113 when no provision has been made to automatically re-register the lot. Alternatively, the lot may transition to the lot registered state 102 via transition 114 when a provision has been made to automatically re-register the lot. Similarly, there may be an automatic provision to resubmit a lot that has not yet received a sufficient bid back to the active state 105 via transition 115 for an additional period of time. If one or more sufficient bids are received for the lot while the lot is in the active state 105, then, following transition to the inactive state 110, the lot transitions via transition 116 to the sold state 111. If the lot contains only a single item or service, or the winning bidder chooses all the items in the lot, then the lot transitions from the sold state 111 to the finish state 112 via transition 117. If, on the other hand, there are more items in the lot not chosen by the winning bidder, then the lot may transition either back to the active state 105 via transition 118 or back to the lot registered state 102 via transition 104. A given silent auction implementation may include more or fewer states than the number of states shown in FIG. 1, and may include either more or fewer state transitions than the state transitions shown in FIG. 1. FIG. 1 is intended to illustrate the states inhabited by a lot during a generalized silent auction.

Certain features of the state transition diagram shown in FIG. 1 provide for relatively easy implementations of Internet-based silent auction systems. Foremost among these features is the relatively limited and non-time critical transitions available to a lot once the lot first reaches the active state 105. The lot may transition out of the active state 105 either following expiration of a timer or following submission of a sufficiently high bid. Note that, in specific implementations of silent auction systems, additional transitions may be possible. However, in all cases, the nature of these transitions leaves a very long window of opportunity for any particular remote bidder. In addition, a remote bidder need not know about the presence of other remote bidders or about their participation in the silent auction. If the silent auction system displays the highest bid received, the remote bidder may check back from time to time, over a period of days, to monitor progress in the bidding, or may be notified by email that they have been outbid, and may then submit a subsequent bid.

In the silent auction, a large number of different lots may concurrently inhabit each of the different states. For example, many hundreds of different lots may be concurrently active for bidding. Because of this, the remote bidder does not need to constantly and rapidly monitor changes in the sequence of the auction or in lot assignments. All the items offered for auction can be viewed by a remote bidder during the course of the auction, and bids can be rationally submitted for those lots of interest to the remote bidder without concern for items being reassigned to different lots or the sequence of lots offered for auction being changed.

FIG. 2 shows a representative state transition diagram for a lot in a real-time, live auction. As in FIG. 1, a lot enters the state "lot registered" 202 via a registration transition 204. The lot may be registered by the auction house or auctioneer via Internet-based methods, or by additional communications methods, including telephone, mailings, and fax. At some specified time interval, the lot transitions to either the state "pre-bid" 206 via transition 208 or to the "open for bidding" state 210 via transition 212. In the pre-bid state, preliminary bids are accepted for the lot, prior to the lot becoming active during the auction, from remote bidders via transition 214. These pre-bids trigger the activation of a bidding agent that automatically produces bids after the lot transitions to the state "open for bidding" 210, discussed below, until either the pre-bidder wins, or the high bid exceeds the pre-bidder's bid value. After another interval of time, the lot transitions from the pre-bid state either to the open-for-bidding state 210 via transition 216 or to the state "pass" 218 via transition 220. The pass state represents the state of a lot that has likely been withdrawn from bidding by the seller, in the case of transition 220. A reason for transition 220 is that the submitted pre-bids are insufficient to warrant placing the lot up for auction. From the pass state 218 the lot may either transition back to the lot registered state 202 via transition 222, in the case that withdrawn lots are automatically rescheduled, or may transition to the state "finish" 224 via transition 226 in the case that withdrawn lots are removed from further consideration. Other transitions from the pass state 218 may be possible in particular implementations, including automatic transitions (not shown) back to the pre-bid 214 and open-for-bidding 210 states. Once a lot transitions to the open-for-bidding state 210, real-time bids are solicited for the lot by a live auctioneer. Only a single lot can inhabit the open-for-bidding state at given time in a live auction. That is also true for the remaining states in the state transition diagram, including the state "presold" 226, the state "fair warning" 228, the state "last chance" 230, the state "sold" 232, and the state "inventory reduction" 233.

From the open-for-bidding state 210, the lot may transition via transitions 234 and 236 to the pass state 218, in the case that no bid, or no sufficient bid, is received after some period of time. During the period of time, insufficient bids can be received via transition 238. When a sufficient bid, i.e. a bid equal to or exceeding some minimum desired value, is obtained, the lot transitions via transition 240 to the presold state 226. A lot in the presold state will be sold to the current highest bidder unless a higher bid is received within some time interval. Additional higher bids may be accepted for the lot while the lot inhabits the presold state 226 via transition 242. If no further bids are received during some time interval, then the lot transitions from the presold state 226 to the fair warning state 228 via transition 244. If a higher bid is received for the lot while it is in the fair warning state 228, then the lot transitions from the fair warning state 228 via transition 246 back to the presold state 226. On the other hand, if no higher bid is received for the lot while it resides in the fair warning state 228, then the lot transitions via transition 248 to the last chance state 230. If a higher bid is received for the lot while the lot inhabits the last chance state 230, the lot transitions back to the presold state 226 via transition 250. However, if no higher bid is received for the lot while the lot inhabits the last chance state 230, then the lot transitions from the last chance state 230 via transition 252 to the sold state 232. If there are no more items in the lot, then the lot transitions from the sold state 232 via transition 254 to the finish state 254. If, on the other hand there are items remaining in the lot that were not sold to the first winning bidder, then the lot transitions via transition 256 to the inventory-reduction state 233, in which other bidders may purchase items from the lot at the current bid price. If unsold items remain after a period of time, the lot containing those unsold items may transition, via transition 257, back to the open-for-bidding state 210.

The additional complexities involved in implementing an Internet-based live auction, in contrast to implementing the silent auction illustrated in FIG. 1, are readily apparent in the state transition diagram of FIG. 2. First, there are far more states that may be inhabited by a lot while the lot is being auctioned in realtime. These active states include: (1) open-for-bidding 210; (2) presold 226; (3) fair warning 228; (4) last chance 230; (5) sold 232; and (6) inventory reduction 233. There are a correspondingly larger number of state transitions possible for a lot that is being auctioned in real-time. Thus, the overall complexity of the process is greater. More importantly, as mentioned above, a lot may traverse the various active states in relatively short periods of time, on the order of tens of seconds. Thus, a relatively large amount of state information concerning a lot must be transferred to remote bidders at extremely rapid rates. Delays on the order of seconds may seriously inhibit a remote bidder's ability to effectively participate in the live auction. As mentioned above, only a single lot can be in any of the active states at any instant of time during the action process period. Thus, the remote bidders must be rapidly notified of changes in lot sequences and lot assignments in order to intelligently participate in the bidding. For example, if a complex lot has been divided by the auctioneer during the auction, and a remote bidder is interested in purchasing a single item from the original complex lot, the remote bidder needs to aware that the remote bidder may have a second chance to bid on the desired item later in auction, following auction of the first of the divided lots, in order to avoid bidding too aggressively for the first of the divided lots. Thus, not only must a large amount of status information concerning the state of a given lot be distributed to remote bidders, but a large amount of additional information concerning lot re-sequencing and reassignment must also be imparted to remote bidders in real time. A reader skilled in the art of implementing Internet-based commerce media will appreciate that implementation of Internet-based live auctions involves a far more complex and technologically demanding solution than implementation of the silent auction model diagrammed in FIG. 1 and discussed above.

Figure 3:
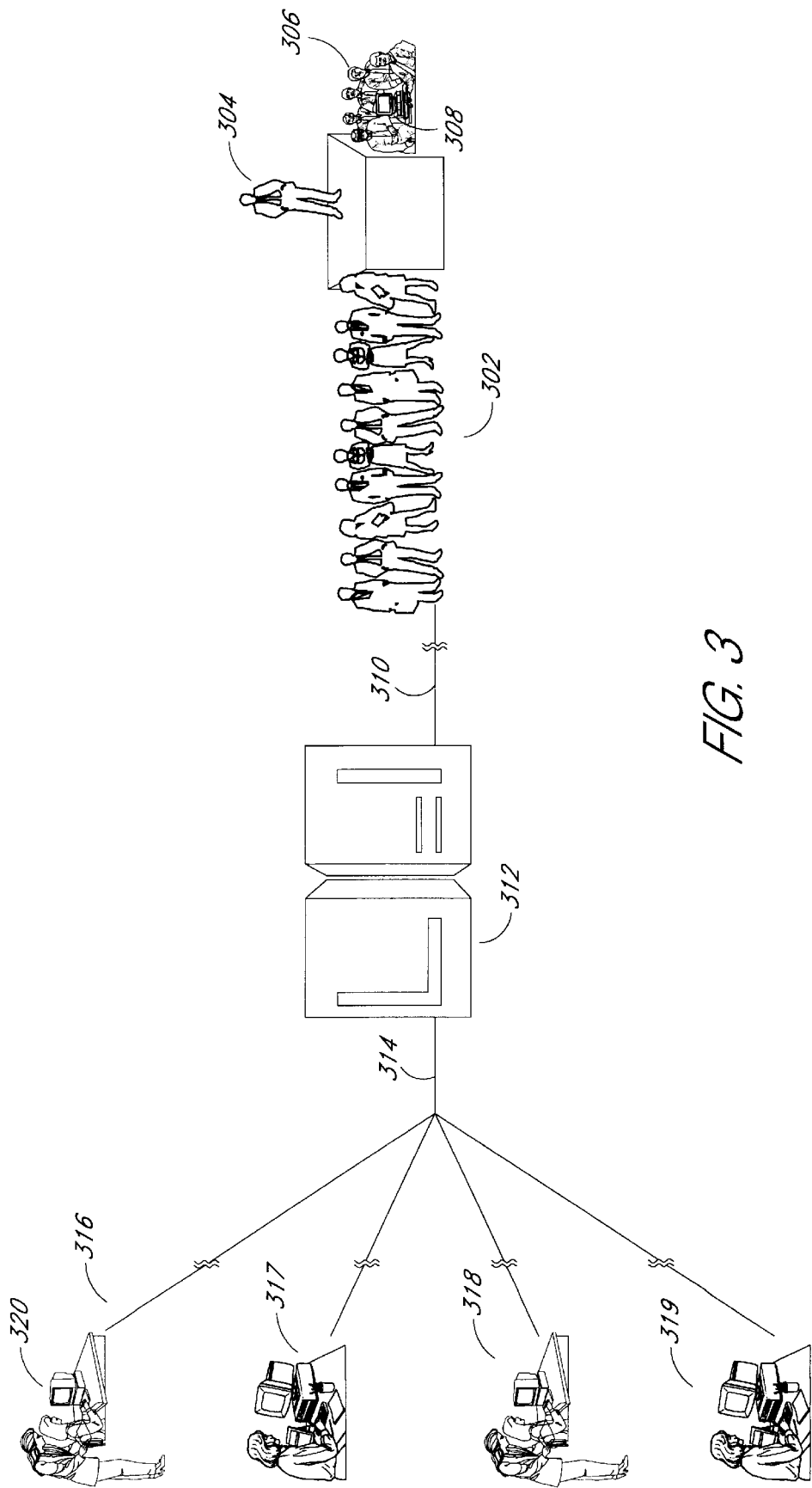
FIG. 3 illustrates the DLA methodology for implementing Internet-based live auctions.

FIG. 3 illustrates, at a high level, the DLA methodology for implementing Internet-based live auctions. The live auction occurs in front of a live audience of bidders 302. The auction is conducted by one or more auctioneers 304. A DLA human proxy 306 is also present within the in-person audience of bidders. The DLA human proxy 306 monitors the auction, including bids made by in-person bidders as well as statements made by the auctioneer 304, and enters the bids and statements into the DLA auction console running on a computer system 308. In a preferred embodiment, a laptop PC may be used to run the DLA auction console for reasons of ease of use and portability. The information regarding the status of the auction entered by the DLA human proxy 306 into the DLA auction console running on the computer 308 is transferred via the Internet 310 to the DLA auction server 312.

The DLA auction server 312 may be implemented on one or more high-end server PCs, workstations, mini-computers, or mainframes. The DLA auction server 312 incorporates the incoming status information from the DLA human proxy 306 into a database representation of the instantaneous state of the auction, and, at the same time, broadcasts status updates via the Internet 314 to a number of remote bidders 316–319. The remote bidders 316–319 monitor the live auction via the status information broadcast from the DLA auction server 312, and may also listen to the auction via real-time audio broadcast of the live auction or watch the auction via real-time video broadcast of the live auction captured by one or more recording devices (not shown) and transmitted to the remote bidders via the Internet or possibly through other communications media, including cable TV and radio. The remote bidders may submit bids for particular items in real-time, just as if they were present, in-person, in the audience 302.

Remote bidders submit a bid via the DLA client program running on the remote bidders' computer system, for example computer system 320, which are then transmitted via the Internet 314 to the auction server 312. Remote bids are filtered and verified by the DLA system so that only valid bids from authorized remote bidders are transmitted by the DLA auction server 312 to the DLA human proxy 306 via the Internet 310 and the DLA auction console running the DLA human proxy's computer DLA 308. Upon receiving a remote bid from a remote bidder, the DLA human proxy 306 may then interact with the auctioneer 304 to submit the bid. If the bid is accepted, that fact, like any other status information concerning the live auction, is submitted by the DLA human proxy 306 via the DLA auction console running on the DLA human proxy's computer 308 and the Internet 310 to the DLA auction server 312 for subsequent broadcast to the remote bidders 316–319. In order for the remote bidders to effectively participate in the live auction, the remote bidders need to receive status updates from the live auction in time periods on the order of a second or less, and, in the same time interval, need to be able to submit bids that appear on the DLA auction console running on the DLA human proxy's computer 308.

Figure 4:
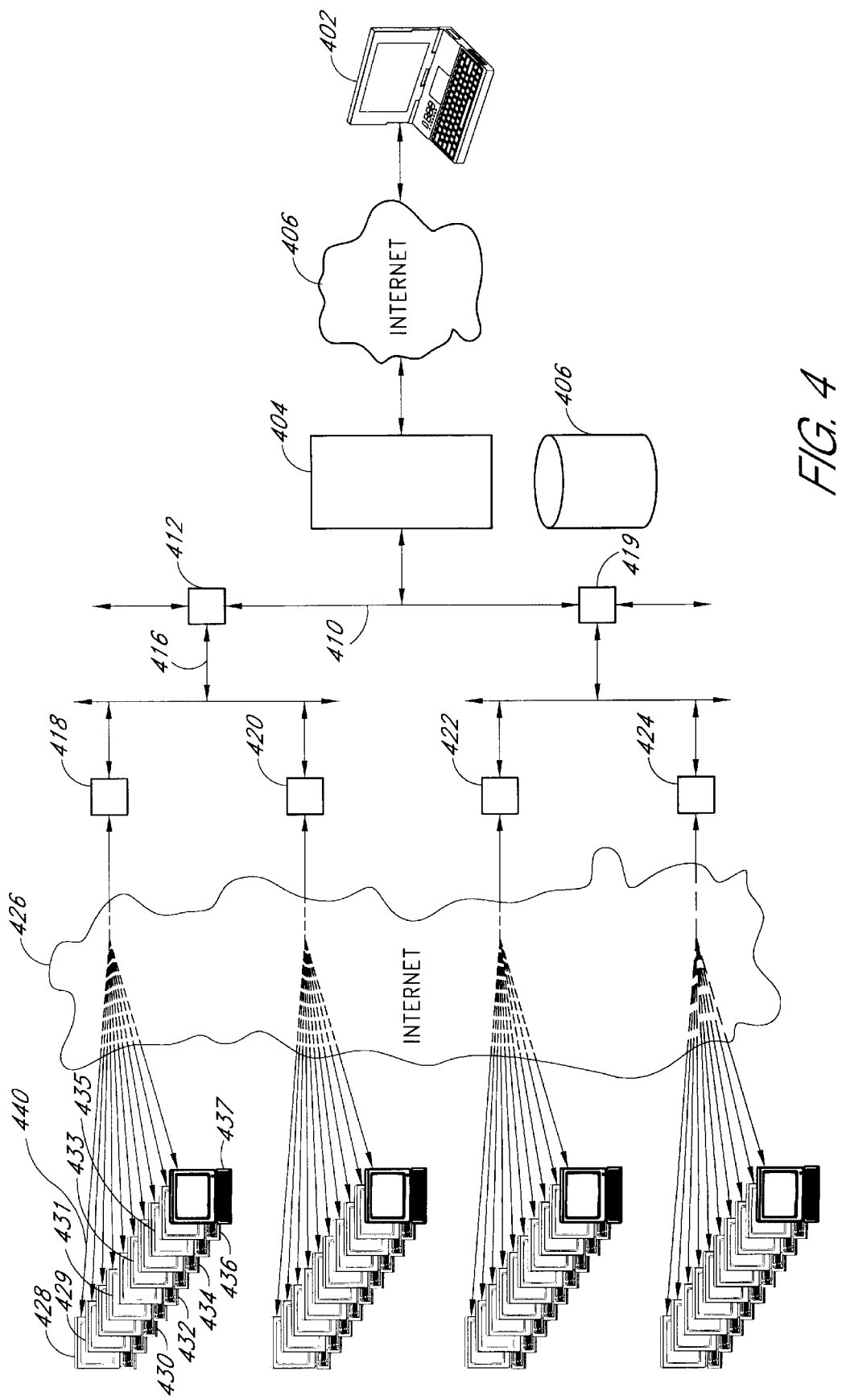
FIG. 4 illustrates the basic system architecture of the DLA that enables rapid, real-time provision of auction status information to remote bidders and rapid, real-time provision of remote bids from remote bidders to an DLA human proxy attending a live auction.

FIG. 4 illustrates the basic system architecture of the DLA that enables rapid real-time provision of auction status information to remote bidders and rapid, real-time provision of remote bids from remote bidders to the DLA human proxy attending the live auction. As mentioned above, the DLA auction console program runs on a computer 402 located on-site at the live auction. The DLA auction console program communicates with the DLA auction server program that runs on one or more server computers 404 via the Internet 406. The DLA auction server program stores and retrieves data from a centralized database 406. The centralized database 406 contains information about ongoing and upcoming auctions, including detailed status information that provides a computational snapshot in time of the state of all ongoing auctions, as well as information related to the lot inventories and lot sequencing for both ongoing and upcoming auctions.

Many thousands or hundreds of thousands of remote bidders may participate in a given auction. The DLA must therefore incorporate technology to enable status information concerning an ongoing auction to be broadcast, in real-time, to the remote bidders and to enable bids to be transmitted from the remote bidders, in real-time, to the auction console program running as the on-site computer 402. The preferred embodiment for this technology is illustrated in FIG. 4. The auction server program running on the server computer 404 is directly interconnected via a communications network 410 to a number of root-level collector/redistributor nodes 412 and 414. Although only two root-level collector/redistributor nodes are shown in FIG. 4, the auction server program, as currently implemented, may be interconnected directly with up to ten route-level collector/redistributor nodes. Each root-level redistributor node, for example collector/redistributor node 412, is connected via a communications network, for example communications network 414, to a next-lower-level set of collector/redistributor nodes, for example collector/redistributor nodes 418 and 420. In FIG. 4, only two levels of collector/redistributor nodes are shown. In a functioning DLA system, a sufficient number of collector/redistributor node levels are dynamically configured in order to support an arbitrary number of connected remote bidders. The hierarchical fan out of levels of collector/redistributor nodes provides for rapid, concurrent distribution of information to remote bidder computers and rapid filtering and collection of bids from remote bidder computers. The leaf-level collector/redistributor nodes, called "first-line nodes" 418, 420, 422, 424, each supports a large number of connections via the internet 426 to a large number of remote bidders'computers, such as remote bidders'computers 428–437. A first-line collector/redistributor node may be concurrently connected to up to 200 remote bidders' computers in a preferred embodiment. The collector/redistributor nodes and the server computer 404 are interconnected by high-speed network communications 410 and 416. Thus, status information may travel from the on-site computer 402 to a remote bidders' computer, for example remote bidders' computer 428, via an initial Internet connection 406, a series of high-speed communications network transfers 410 and 416, and a second connection 440. The TCP/IP connections of the collector/redistributor nodes are multiplexed through a single port, using a multiplexer, because serially sending status information to remote bidders' computers via one or a small number of processes from the server computer 404 would be far too slow for the purposes of informed remote bidder participation in the live auction. Similarly, the hierarchical interconnection of collector/redistributor nodes allows for filtering bids, using a variety of criteria, including lot and auction ID verification, bid value, and various bid inventory checks. The bid inventory checks include checks to make sure that there is sufficient inventory available for a particular bid and to make sure the bid meets minimum inventory requirements established on the floor by the auctioneer, e.g. minimum quantities in quantity lots. Only valid bids with the highest detected bid prices submitted by the remote bidders' computers connected to a particular collector/redistributor node are propagated back towards the server computer 404. This greatly reduces network traffic and message handling in upstream collector/redistributor nodes, the server computer 404, and the on-site computer 402.

DLA Transaction Model

FIGS. 5–8 illustrate the basic client/DLA transaction model. FIGS. 5–8 are divided into columns, such as columns 502 and 504 in FIG. 5. The left-hand columns, such as column 502, represent the transaction from the client's perspective, and the right-hand columns, for example column 504, represents the transaction from the standpoint of the DLA. Right-handed arrows, such as right-handed arrow 506, represent the sending of a message from a client to the DLA via the Internet. Left-handed arrows, such as left-handed arrow 508, represent the sending of a message from the DLA to the client via the Internet. The arrows in FIGS. 5–8, both right-handed and left-handed, may be considered to be a sequence of steps within the transaction described in the figure.

Figure 5:
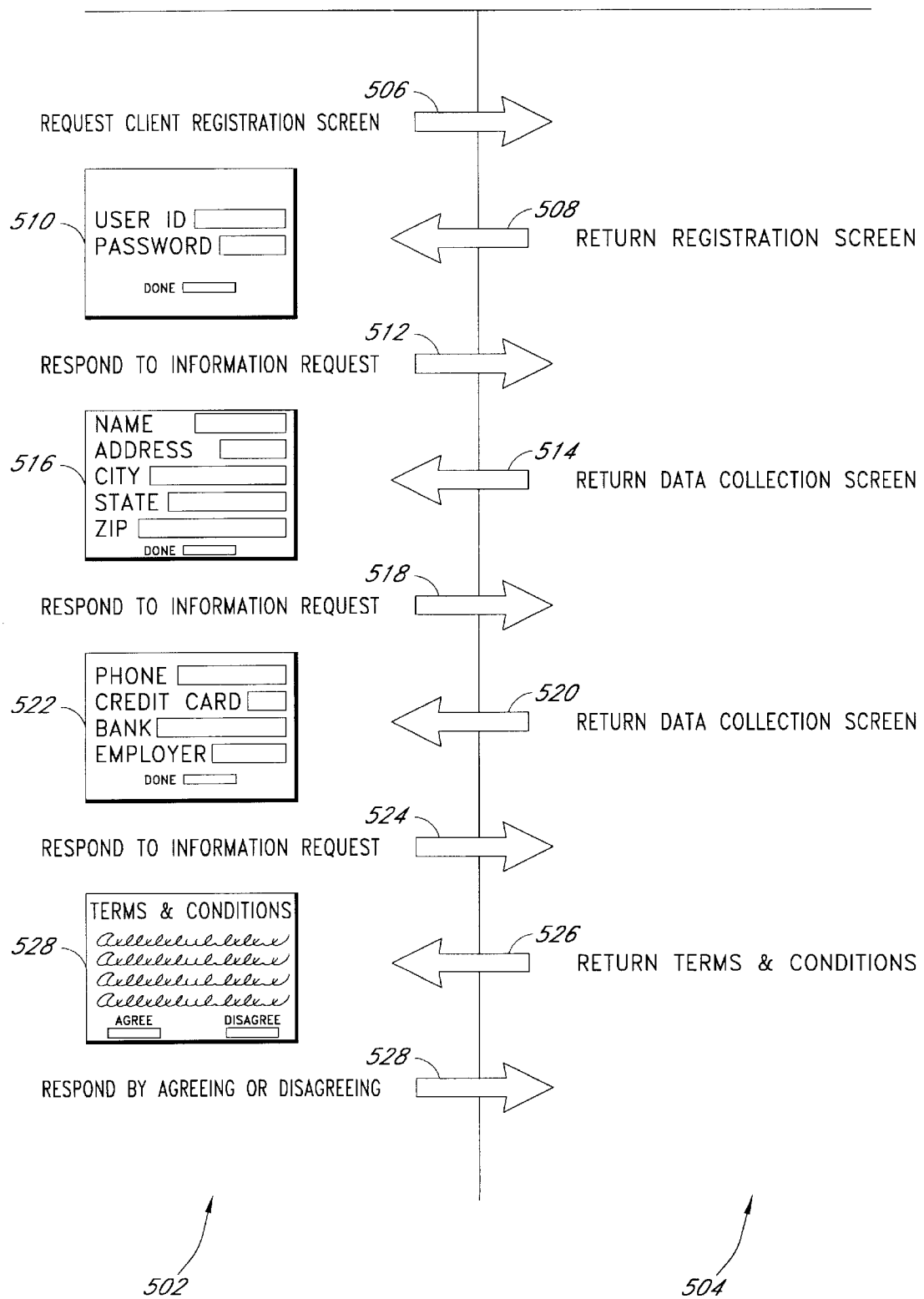
FIGS. 5–8 illustrate the basic client/DLA transactions of the DLA transaction model.

FIG. 5 illustrates the client registration transaction. In a first step 506, a prospective client requests a client registration screen from the DLA in order to commence the client registration transaction. This request may be made, for example, by clicking on a hyperlink within an DLA web page or Internet search-provider results page. In step 508, the DLA returns the registration screen 510. Note that in FIGS. 5–8, simplified representations of various transaction screens are shown as representative examples of the nature of the information requested and displayed. In general, these screens may contain a greater amount of information, or may be implemented as an interactive dialogue, or may alternatively be coalesced into fewer screens or pages or may comprise a greater number of screens or pages. The simplified screens of FIGS. 5–8 are provided for illustrative purposes and represent a generalized data collection or data display process. The first registration screen 510 includes text entry boxes for the user to select a user ID and password with which to subsequently login to the DLA system. Alternatively, the user ID and password may be generated by the DLA based on information provided in subsequent screens shown in FIG. 5, thus obviating the first exchange in FIG. 5 comprising steps 506 and 508. In step 512, the prospective client supplies a chosen user ID and password to the DLA by typing the information into the text entry fields of first registration screen 510 and indicating, by clicking a push button or by some other indication, that the information should be returned to the DLA. Alternative data entry devices may also be displayed, including selection lists or buttons. In step 514, the DLA returns a second registration screen 516 containing text entry fields for input of additional information concerning the prospective client. This information may include the prospective client's name and address, for example. In step 518, the prospective client fills out the second registration form 516 and returns it to the DLA. In optional step 520, the DLA may elect to request additional information from the prospective client via a third registration screen 522. Step 520 is optional in that all pertinent information may be acquired by the DLA via a single screen. On the other hand, additional optional steps, such as step 520, may be necessary to collect further information in other cases. Additional information may include credit card numbers, bank account numbers, employer names and addresses, phone numbers and other such information. All the information provided by the client to the DLA will be maintained by the DLA in one or more databases. The DLA can then use the stored information to facilitate the client's subsequent registration for particular auctions, to be discussed below.

In general, the DLA strives to collect a reasonable superset of information during the registration process commonly required by various auction houses and auction management organizations. By collecting the information initially, and saving the information, the DLA can then automatically retrieve the stored information and supply retrieved information to auction houses and auction management organizations when the client subsequently registers for a particular auction. Subsequent auction registrations may require certain specialized information particular to a particular auction house or auction management organization, or may require updates or modifications of information originally supplied by the client during the registration process.

In step 524, the client finishes entering the requested information into the text entry fields of the data collection screen 522 and indicates, via a push button click or some other indication technique, that the information should be returned to the DLA. In step 526, the DLA sends terms and conditions information that is displayed to the client in a terms and conditions screen 528. The terms and conditions screen represents an agreement, or contract, between the prospective client and the DLA, to which the prospective client can either agree or disagree by clicking on an appropriate user interface object. The prospective client then, in step 528, returns the prospective client's agreement or disagreement to the terms and conditions to the DLA.

There are many alternative steps that may occur in the registration transaction depending on the prospective client's responses. For example, if the client disagrees with the terms and conditions, the DLA may return a screen indicating that the prospective client has not been accepted for registration with the DLA. In the case the client agrees with the terms and conditions, the DLA may return information displayed to the client in additional screens that indicate that the DLA has registered the prospective client as an DLA client and additional informational screens showing the DLA client how to best use the DLA system. Further back in the transaction, the DLA may short circuit a number of steps and reject a prospective client if the credit information, for example, is not verifiable or is inadequate. Finally, at the completion of the registration process, the DLA may download the DLA client program to the new DLA client's computer to allow the client to subsequently interact with the DLA.

Figure 6:
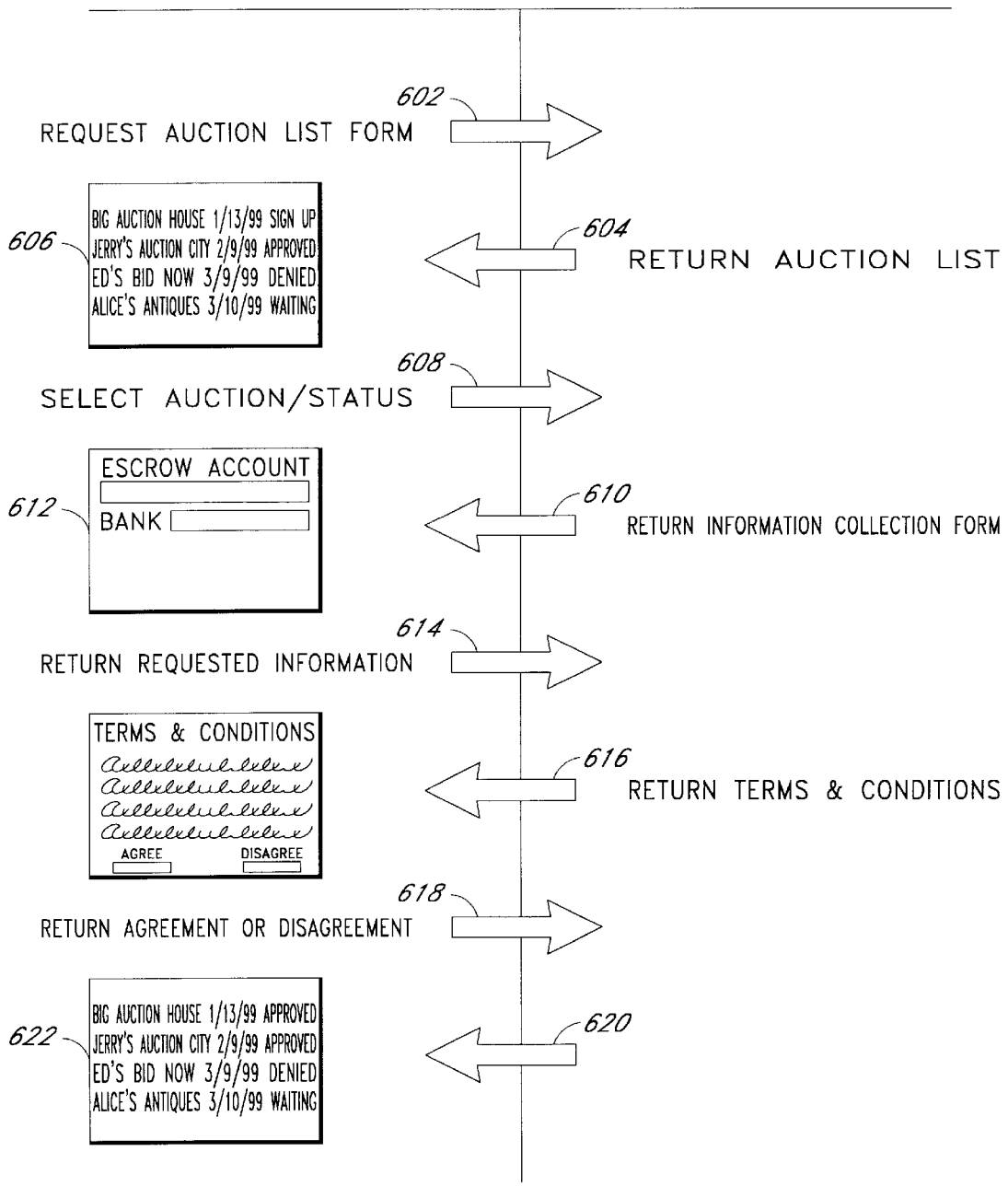
Figure 7:
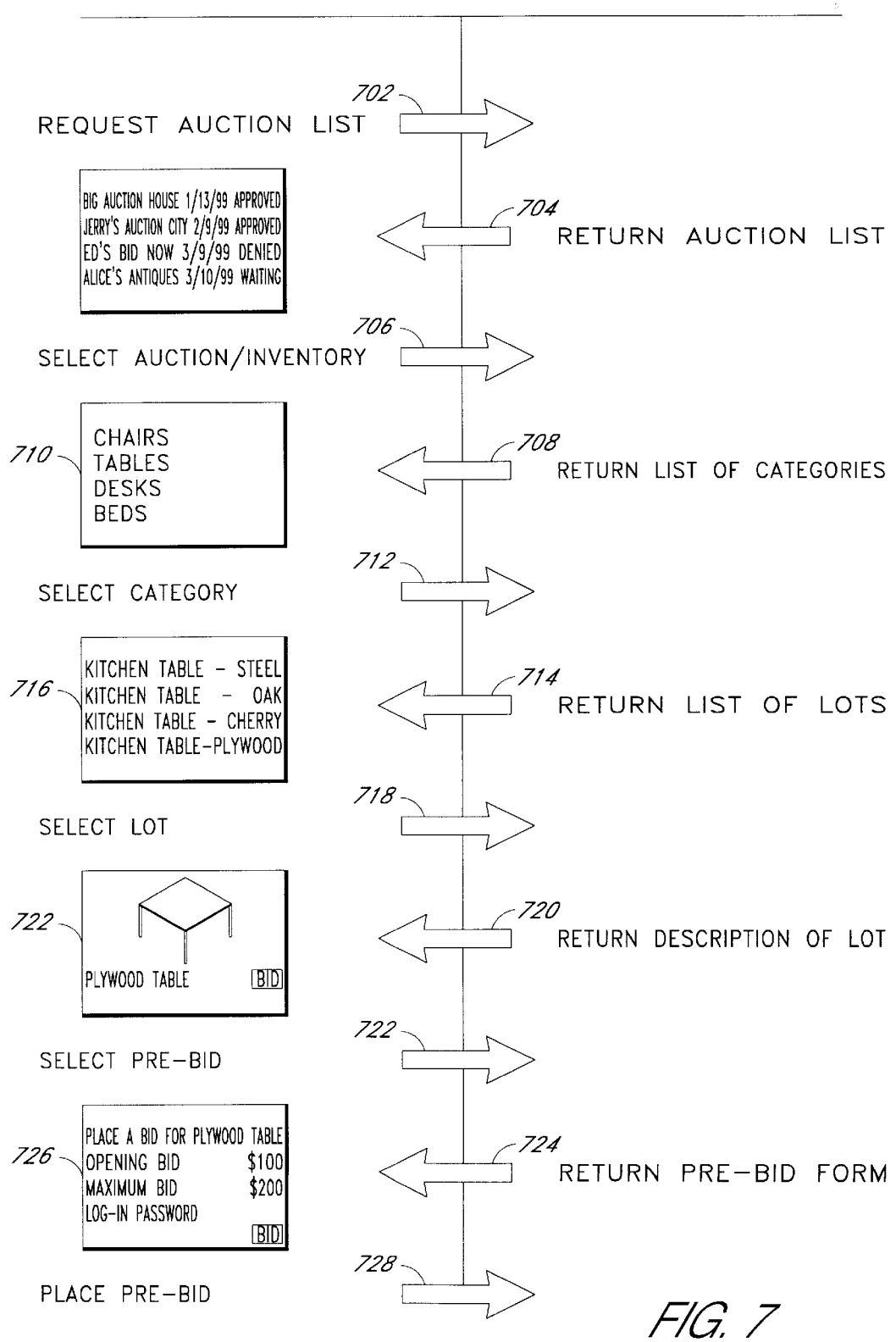
Figure 8:
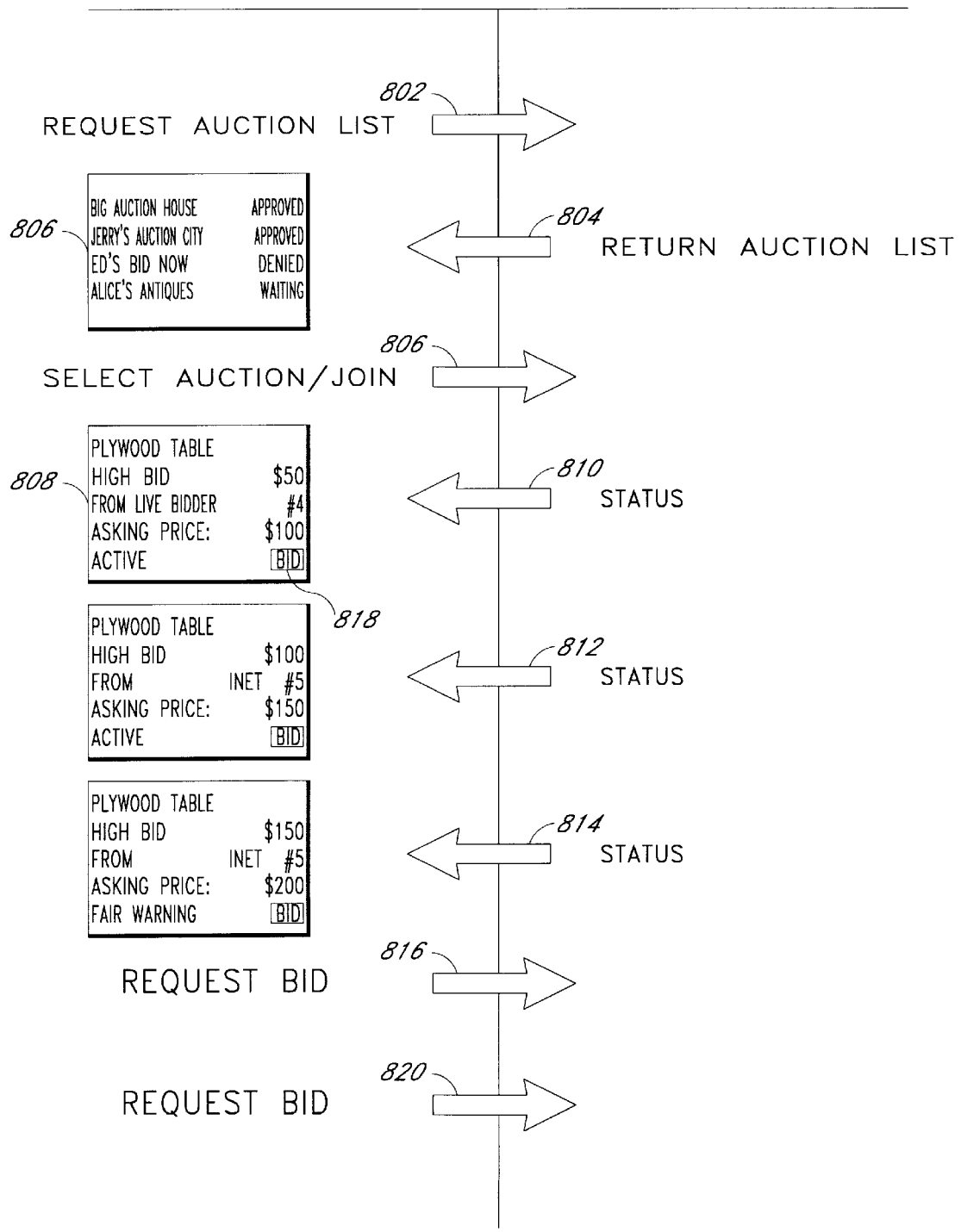

FIG. 6 illustrates the client auction registration transaction. In FIG. 6–8, the user interface screens displayed in the client columns may be generated by the DLA client program running on the client's computer system, using, where appropriate, information transferred from the DLA to the DLA client program via the Internet. Alternatively, in some cases, the user interface screens may be prepared by the DLA and sent to the DLA client program via the Internet. In step 602, the client requests an auction list screen from the DLA via input to the user interface displayed to the client by the DLA client program. In step 604, auction list information is returned by the DLA to the client and displayed to the client in an auction list screen 606. If there are many upcoming auctions, multiple auction list screens may be displayed, or the client may interact with the user interface displayed by the DLA client program to navigate through a hierarchical list of categories for items auctioned in particular auctions in order to arrive at a sub-list of auctions of interest to the client. Alternatively, the client may select other types of sub-lists of upcoming auctions based on the auction date, type of auction, or other such characteristics.

Each auction listed in the list of auctions displayed to the client 606 is associated with a status. Different types of statuses include: (1) "sign-up," a status indicating that the client has not yet attempted to register for the particular auction; (2) "approved," a status indicating that the client has successfully registered for the auction; (3) "denied," a status indicating that the client has attempted to register for the auction, but was denied registration for one of various reasons, including inadequate credit or failure to agree to terms and conditions; and (4) "waiting," a status indicating that the client attempted to register for the auction and that DLA has yet to respond with an approval or denial.

In step 608, the client selects an auction and indicates that the client wishes to attempt to register or re-register for a particular auction by clicking on the status associated with the auction. In step 610, the DLA may then return a data collection screen 612 requesting any additional or particularized information needed from the client in order to register the client for the selected auction. In step 614, the client fills in the requested information into text entry fields, or alternatively, selects various alternatives via user interface selection objects, and returns the information to the DLA. In step 616, the DLA may return a special terms and conditions form to a client for the selected auction, to which the client may agree or disagree in step 618. The exchanges represented by steps 1610 and 1614 and by steps 1616 and 1618 may not be necessary in many cases. It may often be the case that the client provides sufficient information in the registration process so that the DLA may automatically retrieve the previously submitted information from the DLA database and furnish that information to the auction house or auction management organization. Similarly, the initial terms and conditions agreement made by the client during the registration process may be sufficient for a large number of auction houses or auction management organizations, thus obviating the need for a specialized or particularized terms and conditions step related to a particular auction. In step 620, the DLA client program redisplays the list of auctions 622 previously displayed in screen 606, updated with new or additional status information provided to the DLA client program by the DLA. For example, the client request for registration for an auction may be quickly approved, resulting in the status for that auction being displayed as "approved," rather than as "sign-up" or "denied." There may be additional steps in alternative embodiments and implementations of the client auction registration transaction, and additional outcomes for each step depending on information supplied by the client to the DLA.

FIG. 7 illustrates the client inventory browsing transaction. As in FIG. 6, the client requests, in step 702 and receives, in step 704, information from the DLA that is displayed by the DLA client program to the client as an auction list. In step 706, the client selects, from the auction list, a particular auction and indicates, via a user interface indication object, a desire to examine the inventory of lots being offered for sale in the selected auction. In step 708, the DLA returns a list of categories of lots to be offered for sale in a selected auction. The categories may list types of goods or services, in the case of simple or quantity lots, or may include a more elaborate, hierarchical listing, in the case of complex lots. The list of categories of lots are displayed to the user in a display screen 710. In step 712, the client selects particular categories of lots and returns the selection to the DLA. In step 714, the DLA returns a list of lots pertaining to the selected category displayed to the user via screen 716 by the DLA client program. From this list of lots, the client selects a particular lot and returns the selection to the DLA in step 718. In step 720, the DLA returns a description the lot to the DLA client program, which then displays textual, graphical, or a combination of textual and graphical information concerning the selected lot to the client in an informational screen 722. The informational screen 722 may include a user interface object allowing the client to indicate a desire to submit a pre-bid for the selected lot. If the client selects to pre-bid on the lot, the client returns the indication for a desire to pre-bid on the lot to the DLA in step 722. In response, the DLA returns information concerning the pre-bid state of the lot to the DLA client program, which displays the information in a pre-bid screen 726 to the client. The pre-bid screen 726 allows the client to enter information, including a bid price, to return to the DLA in step 728. Additional navigational user interface objects allow the client to navigate back to the auction list and select a different category, or to navigate back to the list of lots or to the informational screen 722. Thus, the client is able to browse through the inventory of lots to be offered for sale at a particular auction, and to pre-bid on those lots offering a pre-bid option.

FIG. 8 illustrates client participation in a live auction. A client requests of list of ongoing auctions from the DLA in step 802, and the DLA returns the requested information in step 804 to the DLA client program which then displays a list of ongoing auctions to the client in a list of auctions screen 806. As in FIGS. 6 and 7, the exchange represented by steps 802 and 804 may involve additional sub-exchanges of information in order to retrieve sub-lists of ongoing auctions according to various categories selected by the client. In step 806, the client selects an auction from the list of auctions and indicates via a user interface object that the client wishes to join that auction. Once the DLA has verified the client's prior registration for the auction, or alternatively, conducts an auction registration dialogue with the client, the DLA client program displays an auction status screen 808 and the client is continuously updated by status information received from the DLA auction console via the DLA auction server program in steps 810, 812, and 814. The status information messages are received by the DLA client program from the DLA as frequently as the status of the live auction is updated by the DLA human proxy's manipulation of the DLA auction console user interface, or as fast as automatic status updates are generated by incoming Internet bids. The client's auction status screen is continuously being updated to reflect the new asking price. If the remote bidder using the DLA client program wishes to submit a bid, he or she clicks a bid button 818, resulting in submission of a bid whose value is equivalent to the current asking price displayed on the client's auction status screen. Once the bid button 818 is clicked, the DLA client program sends a bid message via the Internet to a front-line collector/redistributor node in step 820. The bid is filtered through the DLA and may end up displayed to the DLA human proxy on the DLA auction console. If the client's bid is presented by the DLA human proxy and accepted by the auctioneer, that acceptance will be reflected to the client by subsequent update of the auction status screen 808 via reception by the DLA client program of a subsequent status message from the DLA. If the client's bid is a winning bid, then the client's auction registration information is submitted to the auction house or auction management organization, and the client is notified via the action status screen 808, and additionally notified by other communications methods including e-mail, a telephone call, or some other method. Note that the client who submits a winning bid is contractually bound to submit payment for the good or service, just as a member of the audience present at the site of the live auction is bound to honor a winning bid.

FIG. 9 is a representation of the user interface displayed to the DLA human proxy by the DLA auction console program. This user interface must provide simple and easily recognized controls to allow the DLA human proxy to quickly update status information about the auction as the auction proceeds. Thus, controls are provided to indicate the state of the lot, as discussed above with reference to FIG. 2, as well as to note changes in lot inventory sequences and lot assignments. In a preferred embodiment, the DLA auction console consists of a Java 1.02 applet running in a web browser, either Internet Explorer or Netscape Navigator/Communicator. It maintains a continuous connection with the central auction server to transmit and receive information in real time. The DLA auction console displays the user interface shown in FIG. 9. Certain status messages are displayed in the right hand column 902. These are provided to allow the console operator to ensure that the correct product is being sold and that the correct information is being passed to the remote bidders. Text displayed in red indicates that a remote bidder is currently leading. The center of the user interface consists of an array of buttons 906 used to establish a current bid, a bid increment, and an asking bid. These values can also be typed in directly. Along the top of the user interface is a group of six buttons, including: "Fair Warning" 908, "Last Chance" 910, "Sold" 912, and "Pass" 914. These buttons are used by the human proxy to set specific status flags that are sent to the DLA auction server, and subsequently by the DLA auction server to remote bidders, and are also displayed on the right-hand status readout. The button "Sold Local" 916 sets the sold status flag with the last recorded value from a local bidder, and the button "Next Item" 918 indicates to the server that the next lot number in sequence should be loaded. If an out-of-sequence lot is detected by the human proxy, the human proxy can utilize the text entry field "jump to" 920 to enter a lot number to tell the DLA auction server to load the description and details for a different lot. Using the flash text list of buttons arranged in a column 922 on the left of the user interface, the DLA human proxy can choose to send to the DLA auction server informational or flavor text selected from a series of canned phrases designated ahead of time by the auction house. If none of the canned phrases are appropriate, a text message can be entered and sent by the DLA human proxy using the text entry field 924. Future enhancements will include the capability to group and re-lot lots, as well as a predictive capability to automatically determine the next asking price from current asking price intervals.

Figure 10:
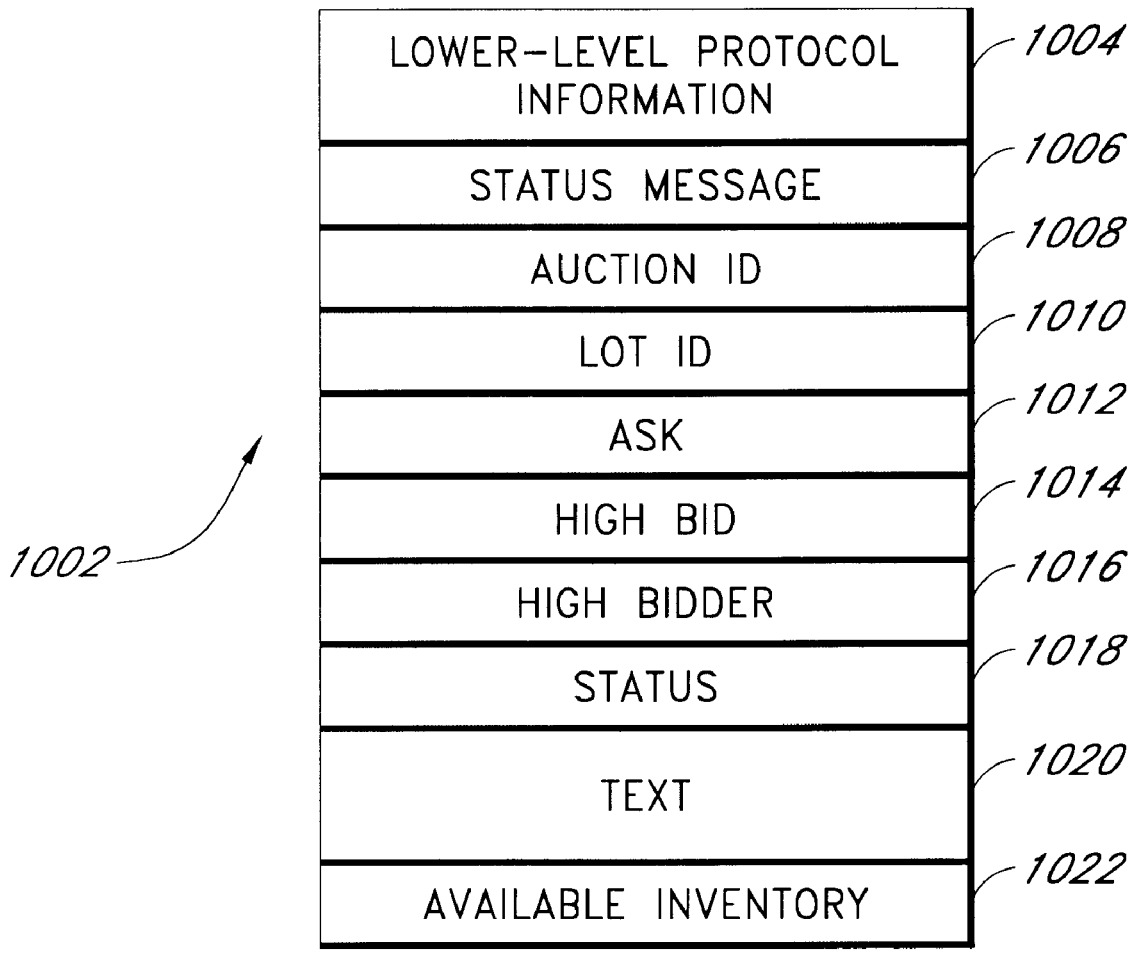
FIG. 10 shows the contents of the status message generated by the DLA auction console.
Figure 11:
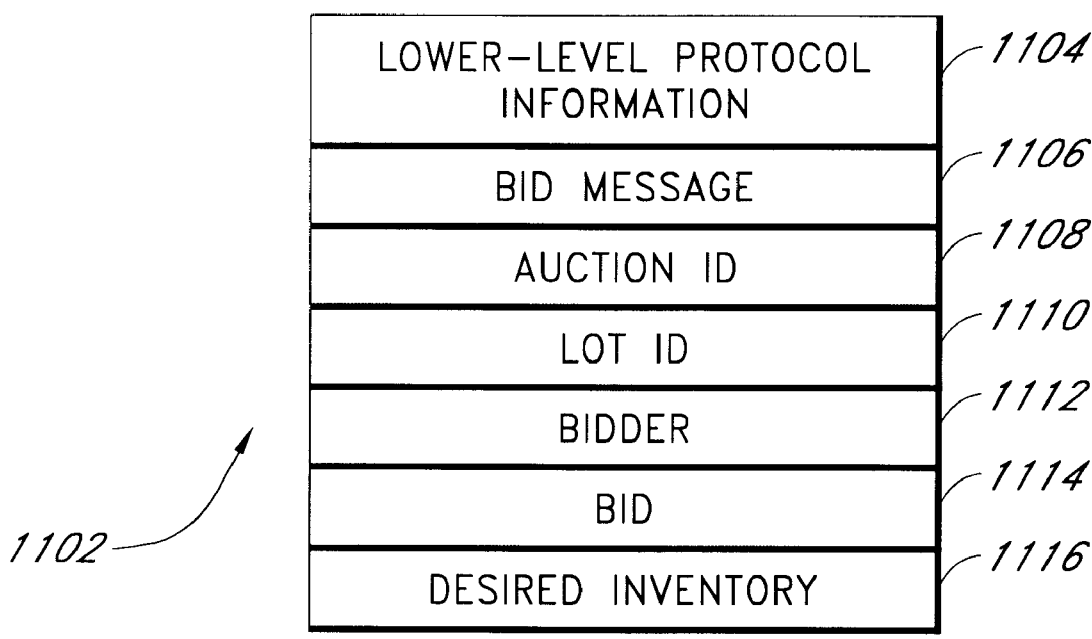
FIG. 11 shows the bid message generated by the DLA client program during a live auction.

FIG. 10 shows the contents of the status message generated by the DLA auction console program, and FIG. 11 shows the contents of the bid message generated by the DLA client program. These two messages form the basis of the realtime information exchange between the DLA human proxy on-site at a live auction and the many remote bidders participating in a live auction via the Internet. Both the status message, 1002, and the bid message 1102, contain lower-level protocol headers and information that allow the messages to be routed through the Internet and through high-speed communications networks. The fields in both the status message 1002 and the bid message 1102 following the low-level protocol information fields 1004 and 1104, respectively, comprise the status and bid messages at the DLA level.

The status message contains the following fields: (1) a message identity field 1006 that indicates the type of message, in this case, a status message; (2) an auction ID field 1008 contains a unique identifier for the auction to which the status message pertains; (3) a lot ID field 1010 that contains a unique identifier for the lot currently being auctioned at the auction identified by the auction ID identifier in the auction ID field 1008; (4) an ask field 1012 that contains the asking price for the lot identified by the lot ID in the lot ID field 1010; (5) a high bid field 1014 containing the highest bid received for the lot identified by contents of the lot ID field 1010; (6) a high bidder field 1016 that indicates the identity of the bidder who submitted the high bid contained the high bid field 1014, where the high bidder may be either a member of the audience present at the live auction or a remote bidder; (7) a status field 1018 that contains the current status for the lot identified in the lot ID field 1010, where the different possible statuses are the active statuses illustrated above in FIG. 2 and discussed above with reference to FIG. 2; (8) a text field that may contain additional textual information supplied by the DLA human proxy with reference to the status of the lot identified by the lot ID contained in lot ID field 1010, or, alternatively, information with regard to status and updates concerning the auction identified by the auction ID contained in the auction ID field 1008; and (9) an available inventory field 1022 that describes the available inventory in the lot. Status messages having the illustrated format are continuously generated by the DLA auction server program and sent via the DLA system to remote bidders.

The bid message 1102 contains the following fields: (1) a message identifier field 1106 text contains an indication of the type of the message, in this case, a bid message; (2) an auction ID field 1108 similar to the auction ID field 1008 of the status message 1002; (3) a lot ID field 1110 similar to the lot ID field 1010 of the status message 1002; a bidder field 1112 that contains a unique identifier for the remote identifier that submitted the bid that generated the bid message; (5) a bid field 1114 that contains the bid price submitted by the bidder and the bid that generated the bid message; and (6) a desired inventory field 1116 that contains the bidder's desired inventory for a composite lot. Bid messages are generated by the DLA client program running on remote bidders' computers and sent via the DLA system to the DLA human proxy.

DLA System Components

In this subsection, four basic components of the DLA system, including the DLA client program, the collector/redistributor node, the DLA auction server program, and the DLA auction console program, will be described in block diagrams and in flow control diagram. These descriptions represent a preferred embodiment, but by no means the single possible embodiment of the DLA system. The component software program may be implemented in many different ways in many different languages and run on many different types of computers featuring different operating systems. Functionalities encapsulated in one particular component in the preferred embodiment may be, in alternate embodiments, implemented in different components. In alternate embodiments, a different number of basic DLA components may be employed to implement the DLA auction methodology described above.

Figure 12:
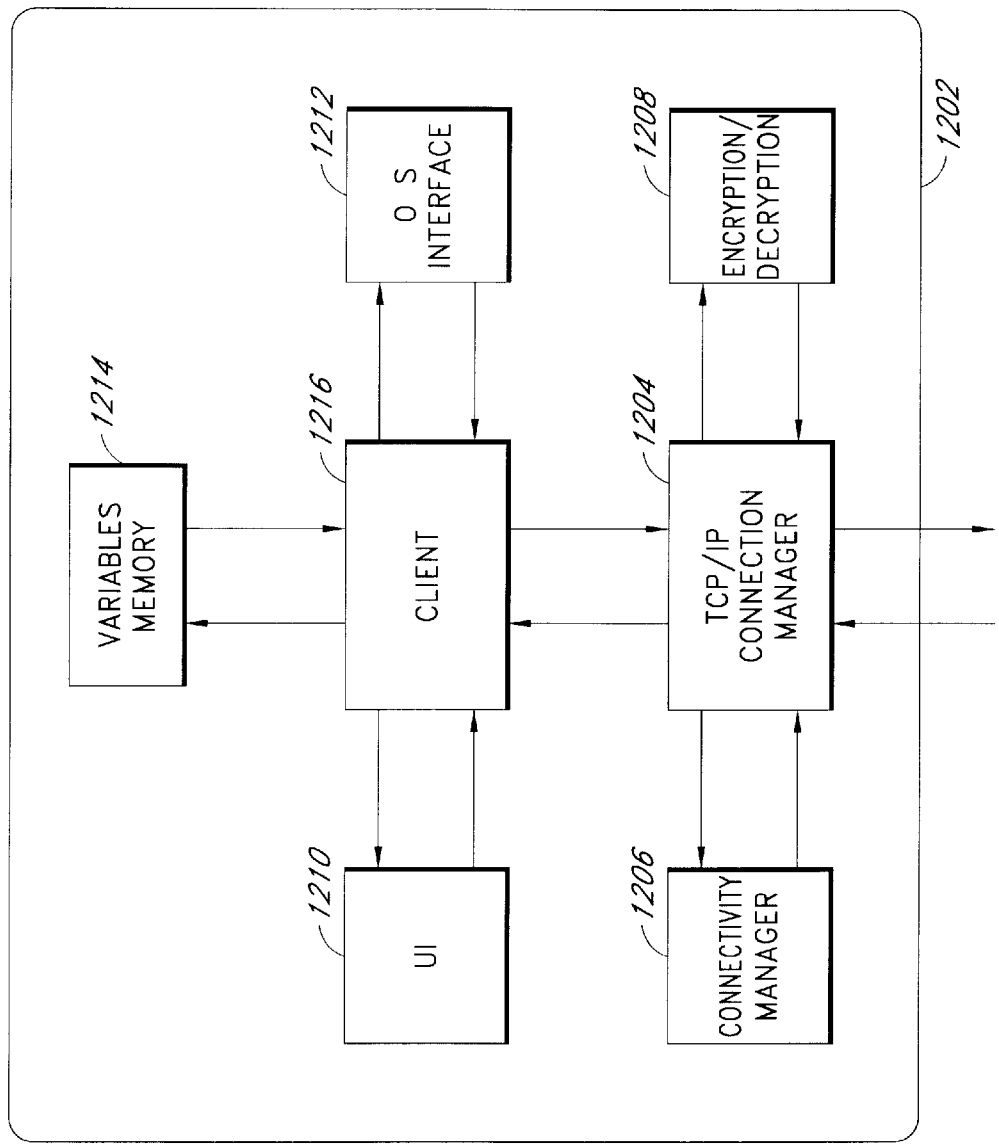
FIG. 12 is a blocked diagram of the DLA client program

FIG. 12 is a block diagram of the DLA client program. The DLA client program 1202 includes the following components: (1) A TCP/IP connection manager 1204 that transmits all outgoing messages to the Internet and receives all incoming messages from the Internet; (2) a connectivity manager 1206 that monitors message traffic to detect connection failures and that directs reestablishment of failed connections by the TCP/IP connection manager 1204; (3) an encryption/decryption module 1208 that is called by the TCP/IP connection manager to decrypt encrypted incoming messages and to encrypt outgoing messages; (4) a user interface module 1210 that manages the display of graphical information, such as the live auction status screen, to a remote bidder; (5) an operating system interface 1212 that represents the various operating system calls employed by the DLA client program to implement the various functionalities supported by the DLA client program; (6) the memory used by the DLA client program, including memory allocated to various state variables such as the current auction ID and lot ID; and (7) the client process 1216 that interconnects the user interface 1210, the OS interface 1212, the TCP/IP connection manager 1204, and memory and state variables 1214 to implement the functionality supported by the DLA client program, such as the client registration transactions, the client auction registration transactions, client browsing of auction inventories, and client participation in live auctions, discussed above in the previous subsection.

Figure 13:
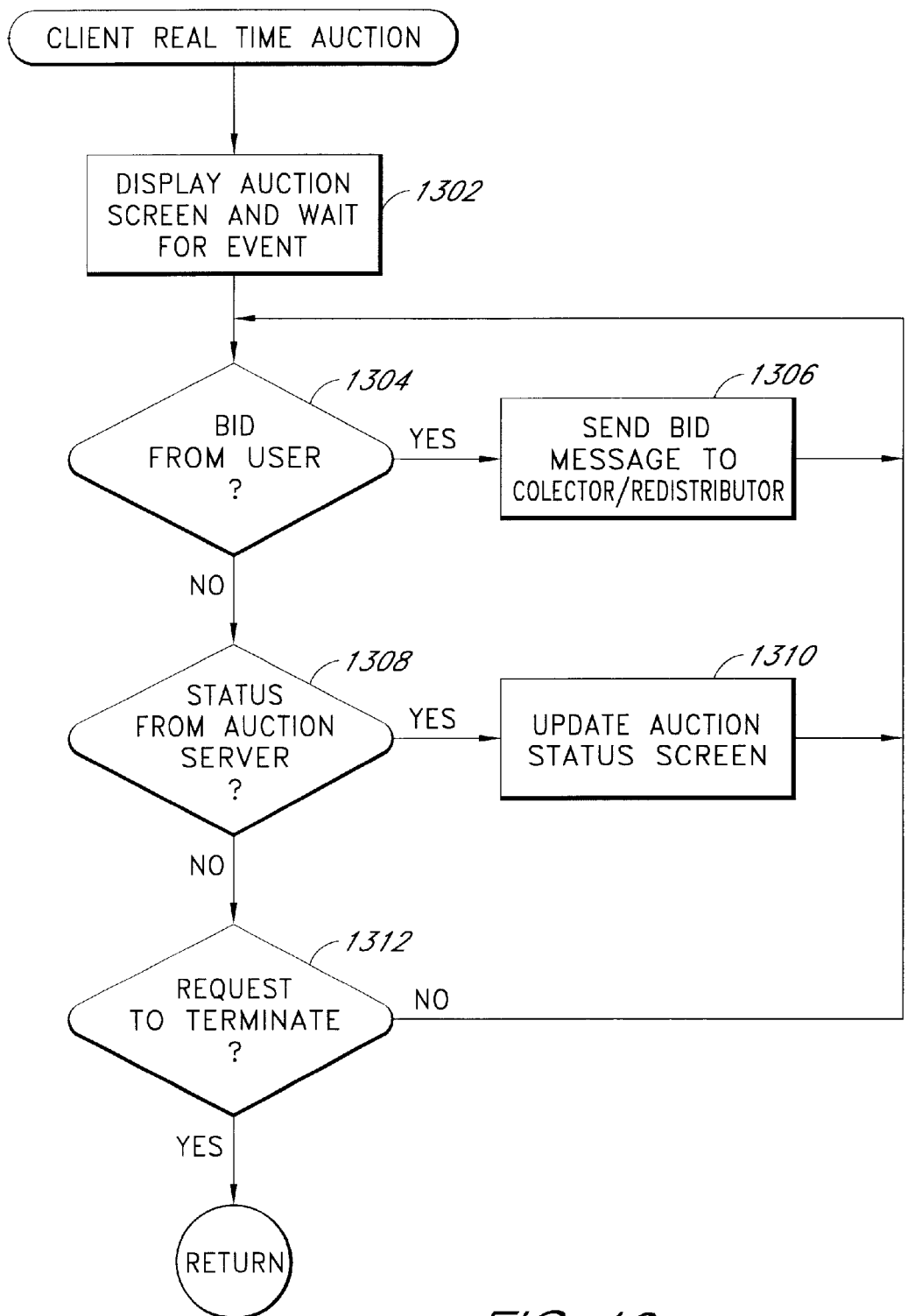
FIG. 13 is a flow control diagram of that portion of the DLA client program concerned with supporting and facilitating a client's participation in a live auction.

FIG. 13 is a flow control diagram of that portion of the DLA client program concerned with supporting and facilitating a client's participation in a live auction. In step 1302, the DLA client program displays to a client the auction status screen and then waits for any of a number of different types of events that may occur. If the client submits a bid, as detected by the DLA client program in step 1304, and the DLA client program packages the bid information into a bid message and sends the bid message to a first line collector in line/redistributor node in step 1306, after which the DLA client program resumes waiting for another event. If the DLA client program receives a status message from the DLA auction server, detected in step 1308, the DLA client program extracts information packaged in the status message and uses that information to update the auction status screen display in step 1310, after which the DLA client program resumes waiting for another event. If the DLA client program receives a request to terminate the program, as detected in step 1318, then the portion of the DLA client program related to the participation of a client in a real-time live auction returns, in step 1320. Otherwise, the DLA client program resumes waiting for another event.

Figure 14:
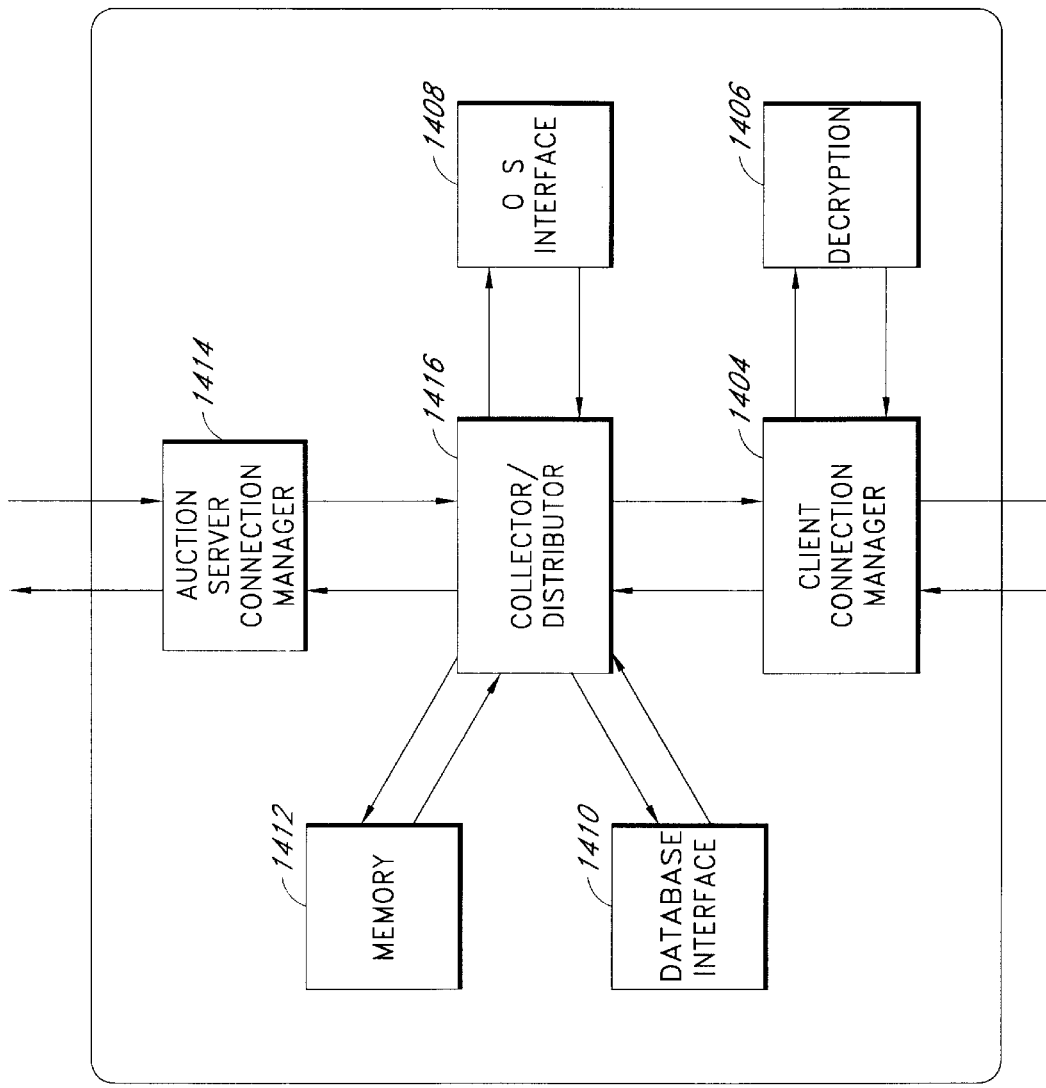
FIG. 14 is a blocked diagram of a collect/redistributor node.

FIG. 14 is a block diagram of a collector/redistributor node. The collector/redistributor node contains the following subcomponents: (1) a client connection manager 1404 that manages a number of TCP/IP connections to remote bidders, currently capable of handling up to 200 simultaneous TCP/IP connections; (2) a decryption module 1406 used by the client collection manager 1404 to decrypt incoming encrypted messages from remote bidders; (3) an OS interface 1408 similar in function to the OS interface of the DLA client program (1212 in FIG. 12); (4) a database interface 1410 that provides storage and retrieval of client validation information that allows a first-line collector/redistributor node to validate incoming messages from remote bidders with regard to authorization and registration of the remote bidder to participate in a particular auction; (5) a memory and state variable component 1412 similar in nature to the memory and state variable component of the DLA client program (1214 in FIG. 12); (6) an auction server connection manager 1414 that passes filtered bids from remote bidders to the next highest-level collector/redistributor node, or, in the case of a root-level collector/redistributor, to the DLA auction server program, and that receives status messages from the DLA auction server program to distribute to remote bidders; and (7) a collector/redistributor module 1416 that ties together the client collection manager 1404, the OS interface 1408, the database interface, in the case of a first-line collector/redistributor, the memory and state variable component 1412, and the auction server connection manager 1414 in order to implement the status distribution operation and remote bid filtering and pass-through operation that form the basis of the collector/ redistributor node functionality related to the conduct of a live auction over the Internet.

Figure 15:
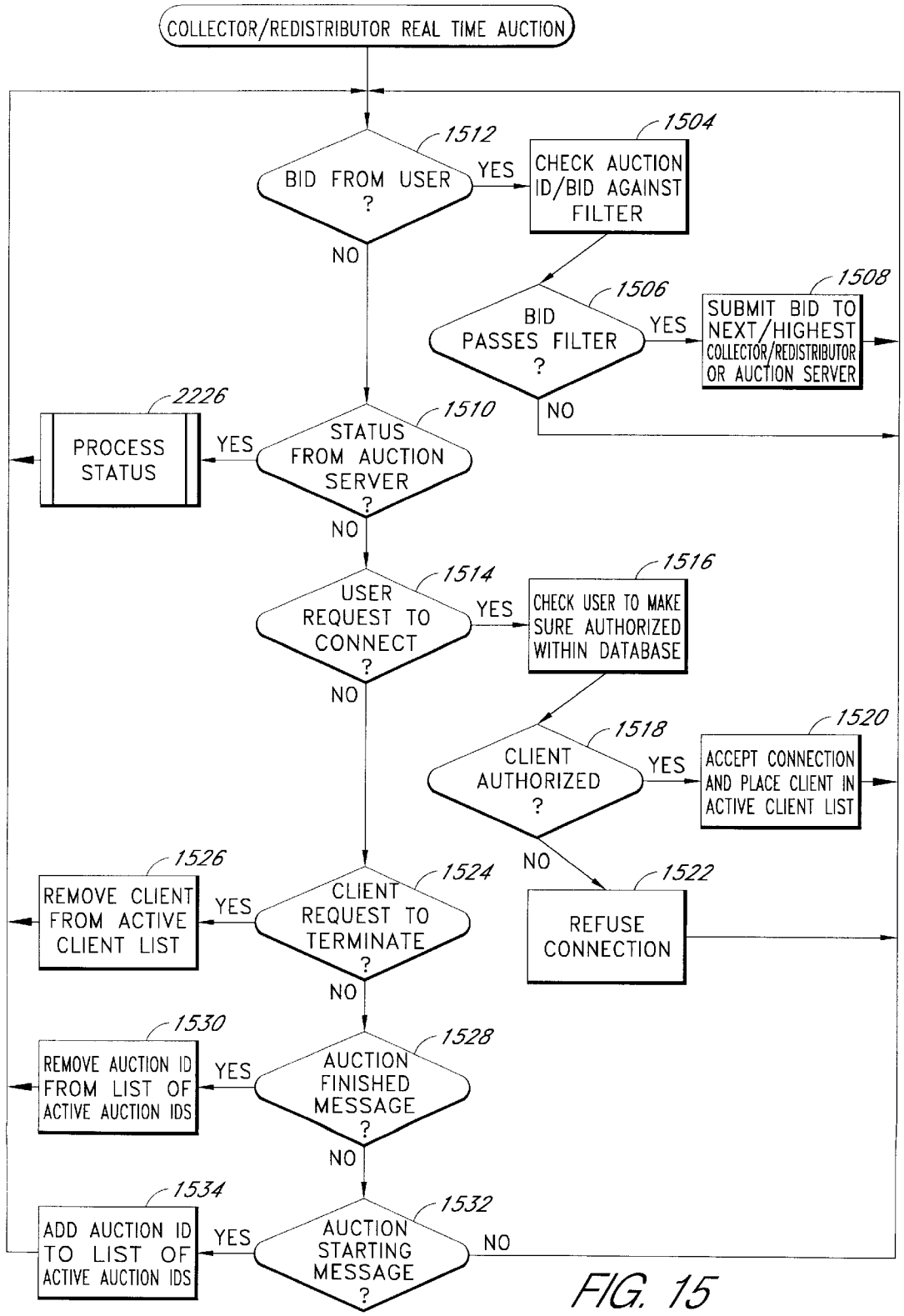
FIG. 15 is a flow control diagram that portion of the collector/redistributor node related to carrying out one or more simultaneous live auctions over the Internet via the DLA client program.

FIG. 15 is a flow control diagram of that portion of the collector/redistributor node related to the carrying out of one or more simultaneous live auctions over the Internet by the DLA. The collector/redistributor essentially waits, in an endless loop, for one of a number events to occur, and handles each event that occurs. If the collector/redistributor is a first-line collector/redistributor, and the collector/redistributor receives a bid message from a remote bidder, as detected in step 1502, the collector/redistributor checks, in step 1504, the auction ID and lot ID against a list of current auctions and their respective current lot numbers to determine whether the bid is valid. Also in step 1504, the collector/redistributor checks the bid amount contained in the bid field of the bid message against the current high bid received for the identified lot of the identified auction. Only if the bid is higher than the current highest bid for the identified auction, as detected by the collector/redistributor from bid messages received from other remote bidders or from status messages received from the DLA auction server, will the collector/redistributor forward the bid on to the DLA auction server. If the bid is valid and represents a higher bid, as detected in step 1506, the collector/redistributor submits the bid to either a next-highest-level collector/redistributor or to the DLA auction server in step 1508, after which the collector/redistributor continues to wait for another event. On the other hand, if the bid does not pass the filter, as detected in step 1506, the collector/redistributor simply resumes waiting for another event. The collector/redistributor node may employ a hash table containing auction ID, lot ID, and high bid triples in order to facilitate rapid filtering of a bid. If the collector/redistributor receives a status message from the DLA auction server program, as detected in step 1510, the collector/redistributor calls the routine "process status" in step 1512 to process the status message, and then resumes waiting for another event. If the collector/redistributor is a first-line collector/redistributor, and the collector/redistributor receives a request from a DLA client program to connect to an ongoing auction, as detected in step 1514, the collector/redistributor validates the DLA client program against the validation database in step 1516. If the DLA client program, and remote bidder that has invoked it, is properly authorized, as detected in step 1518, the collector/redistributor accepts the connection and places a unique client identifier associated with an auction ID into an active client list in step 1520, and then resumes waiting for another event. If, on the other hand, the collector/redistributor determines that the client is not authorized to participate in the desired auction, as detected in step 1518, then the collector/redistributor refuses the connection request in step 1522 and resumes waiting for another event. If the collector/redistributor receives a client request to terminate connection to an auction, as detected in step 1524, the collector/redistributor removes the client from the active client list in step 1526 and resumes waiting for another event. If the collector/redistributor receives a message from the DLA auction server indicating that an auction has finished, as detected in step 1528, the collector/redistributor removes the auction ID from the list of active auction ID's in step 1530 and then resumes waiting for another event. If the collector/redistributor receives an auction starting message from the DLA auction server, as detected in step 1532, the collector/redistributor adds the ID of the starting auction to a list of active auction ID's in step 1534, and then resumes waiting for another event. On the other hand, if none of the above-mentioned events are identified, as indicated by the negative output in step 1532, the collector/redistributor simply continues to wait for another event.

Figure 16:
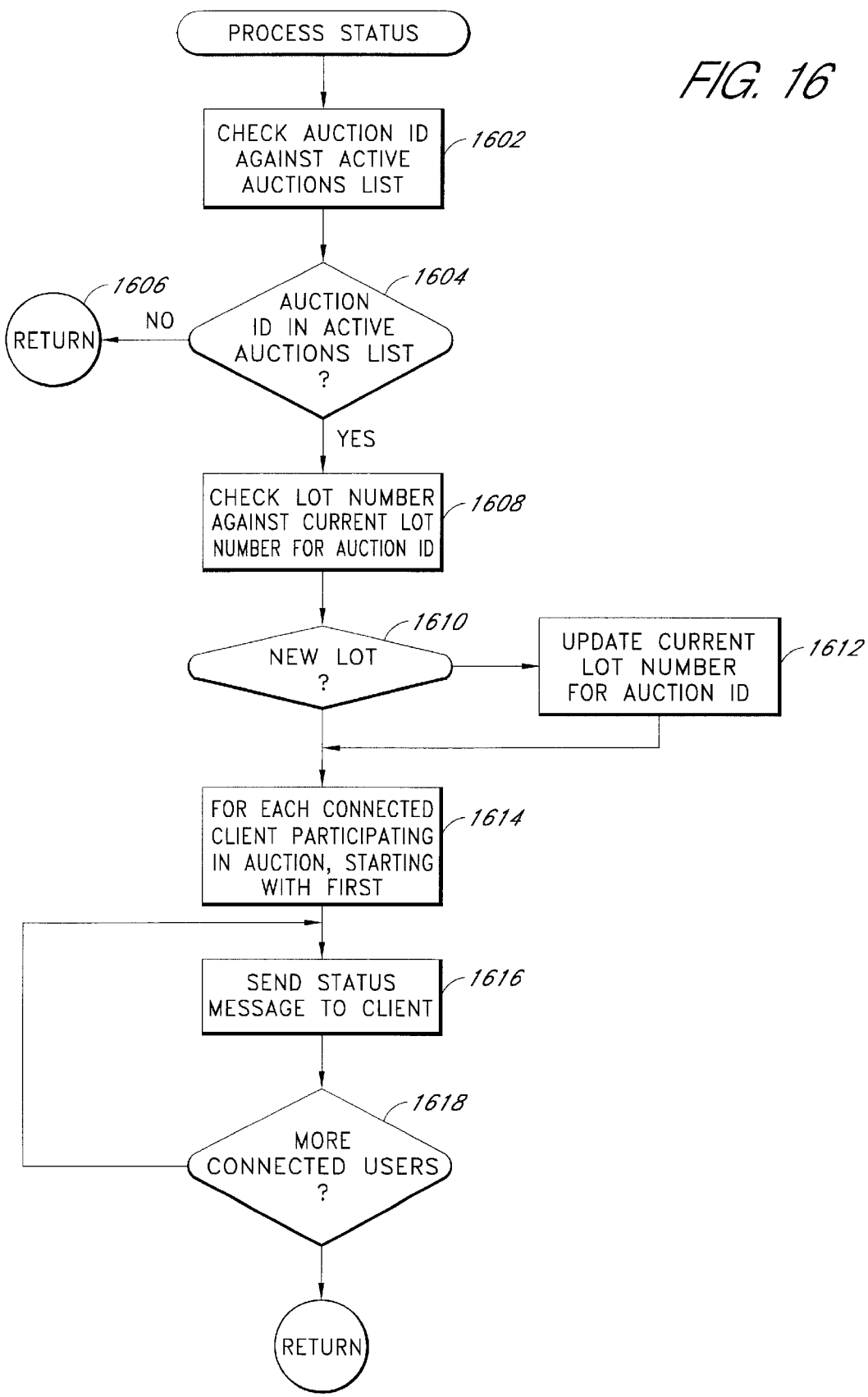
FIG. 16 is a flow control diagram for the routine "process status."

FIG. 16 is a flow control diagram for the routine "process status." The routine "process status" is called by the collector/redistributor in step 1512 in FIG. 15. In step 1602, the collector/redistributor checks the auction ID in the status message against an internal list of active auctions. If the auction ID is not in the active auctions list, as detected in steps 1504, the routine "process status" returns to step 1606. Note, as an alternate embodiment, the routine "process status" could assume that the status message relates to a new auction for which a start auction message has not yet been received, and add the auction ID to the list of active auction ID's and continue processing in step 1608. Alternatively, the collector/redistributor could initiate a dialog with the DLA auction server to resynchronize information concerning the current state of all ongoing auctions. In step 1608, the collector/redistributor checks the lot number in the status message against the current lot number for the auction identified by the auction ID included in the status message. If the lot number is a new lot number, or, in other words, if the lot number in the status message does not correspond to the current lot number associated with the auction in the active auction list maintained by the collector/redistributor, as detected in step 1610, the collector/redistributor updates the current lot number for the auction identified by the auction ID in the active auction list maintained by the collector/redistributor in step 1612. For choice and quantity lots, the process "status," in step 1608, also reads the available inventory from the incoming status message in order to subsequently compare the desired inventory of the incoming bids to the currently available inventory to make sure that the incoming bids have enough inventory to meet the conditions set by the auctioneer on the floor, e.g. a declaration of "one money!" indicating that all the items in the lot must be sold at once, and to make sure that lots have enough inventory for the bidders, e.g. a bidder that will take no less than 100 units in a quantity lot may not submit a bid for which there are only 90 units left. These additional filter conditions for choice and quantity lots are carried out in step 1505 of FIG. 15. Then, in the loop represented by steps 1614, 1616, and 1618, the collector/redistributor forwards the status message to the clients connected to the collector/redistributor, in the case of a first-line collector/redistributor, or forwards the status message to all collector/redistributors at the next-lowest level connected to the collector/redistributor.

Figure 17:
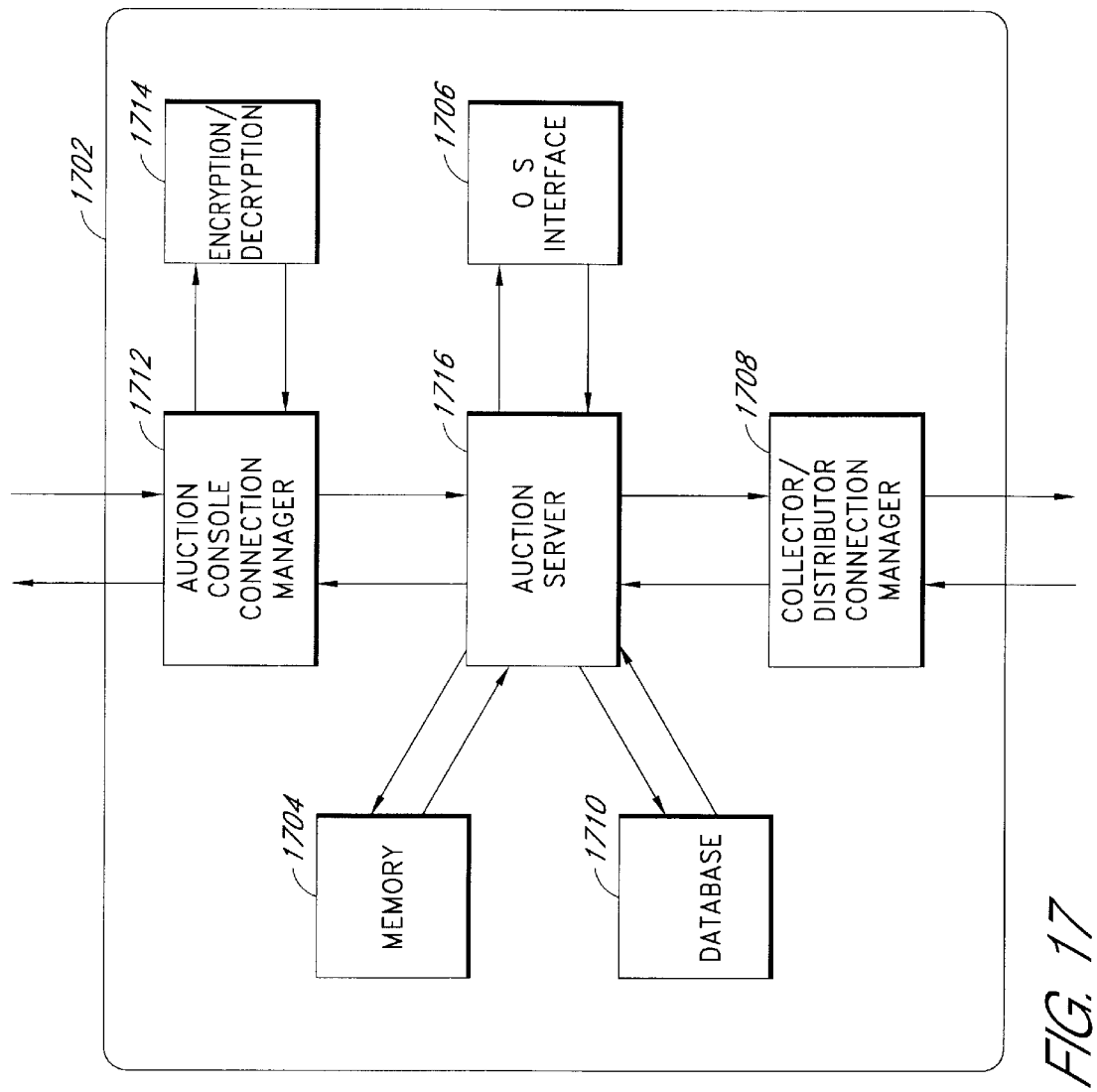
FIG. 17 is a blocked diagram of the DLA auction server program.

FIG. 17 is a block diagram of the DLA auction server program. The memory component 1704 and OS interface component 1716 are similar to the memory and OS interface components of the collector/redistributor and DLA client program, discussed previously with regard to FIGS. 12 and 14, and will not be discussed further in the interest of brevity. The DLA auction server program 1702 includes the following components: (1) a collector/redistributor connection manager that maintains up to ten network connections with root-level collector/redistributor nodes, sending status messages and other types of messages to the collector/redistributor nodes and receiving bid messages and other types of messages from collector/redistributor nodes; (2) a database interface component 1710 that represents an interface to an extensive database that contains information about ongoing and upcoming auctions, including detailed inventory lists, inventory sequences, lot assignments, and the current, instantaneous state of any particular ongoing auction; (3) a auction console connection manager component 1712 that manages TCP/IP connections to one or more DLA auction console programs running on-site computers; (4) an encryption/decryption module 1714 that decrypts incoming messages and encrypts outgoing messages; and (5) a auction server component 1716 that interconnects the memory component 1704, the OS interface component 1706, the database component 1710, the collector/redistributor manager 1708, and the auction console connection manager 1712 to implement the functionalities provided by the DLA auction server to facilitate Internet-based live auctions.

Figure 18:
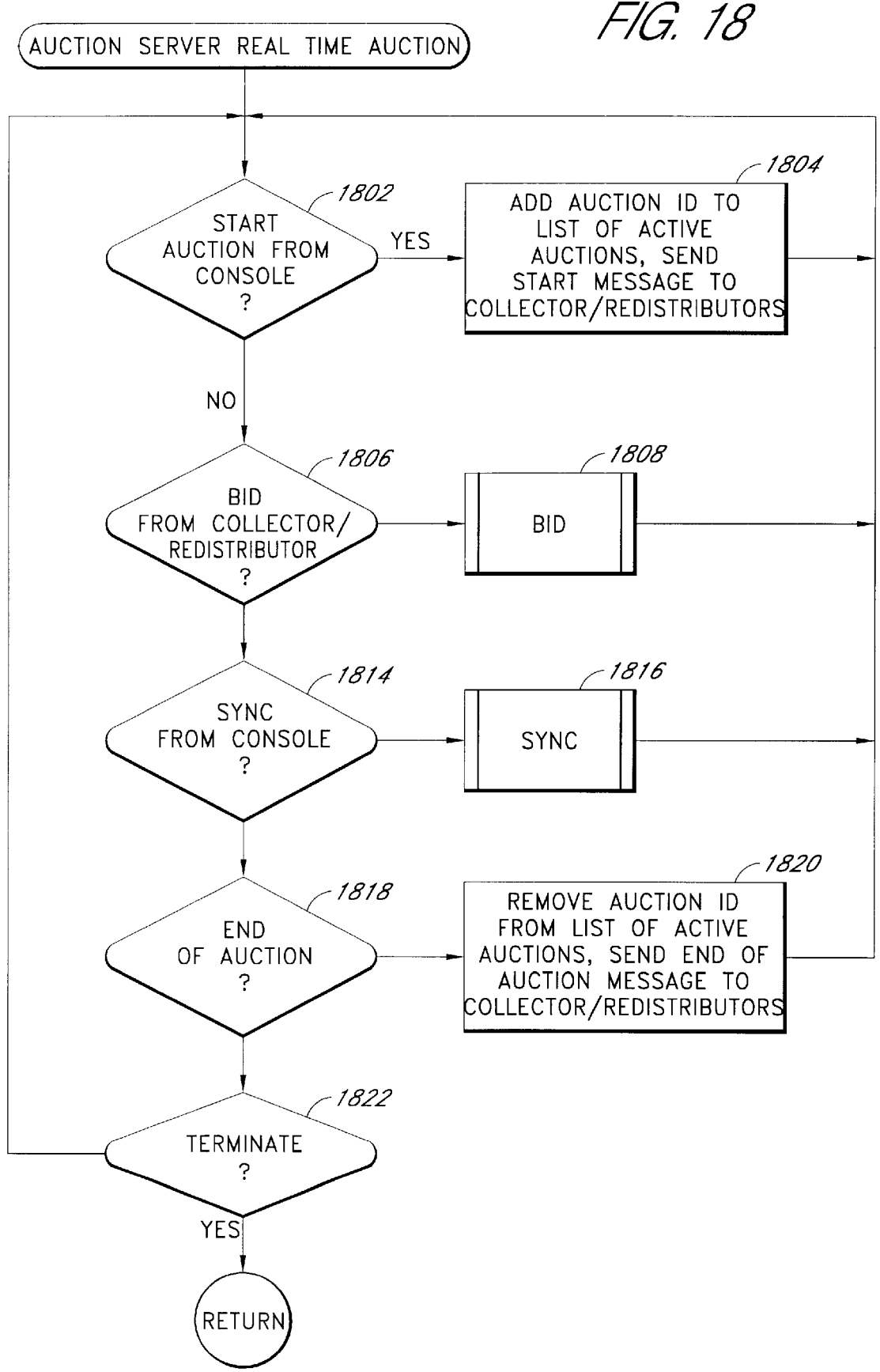
FIG. 18 is a flow control diagram for that portion of the DLA auction server program involved in implementing Internet-based live auctions.

FIG. 18 is a flow control diagram for that portion of the DLA auction server program involved in implementing real-time Internet-based live auctions. This portion of the DLA auction server program essentially waits in an endless loop for events to occur, and then handles the events. If the DLA auction server program receives an auction start message from and DLA auction console program, as detected in step 1802, the DLA auction server program adds the auction ID to a list of active auctions, sends a start message to root-level collector/redistributor nodes in step 1804, and then resumes waiting for another event. If the DLA auction server program receives a bid from a root-level collector/redistributor node, as detected in step 1806, DLA auction server program calls the routine "bid" in step 1808 to handle the received bid message and then resumes waiting for another event.

If the DLA auction server program receives one of a number of different types of sync messages from a DLA auction console program, as detected in step 1814, the DLA auction server program calls the routine "sync," in step 1816, to handle the sync messages and then resumes waiting for another event. In some cases, the DLA auction server generates status messages upon receiving certain sync messages, and forwards the status messages on to remote bidders via the collector/redistributor nodes. If, for example, the DLA auction server receives a "Next Lot" or "Pass" sync message from the console, it forwards the lot cursor to the next lot and generates a new status message. As another example, if the DLA auction server receives a "Console State" sync message from the console, it sets the state of the lot to that state and generates a new status message to the clients, where the states may include certain of the active states discussed above with reference to FIG. 2. If the DLA auction server receives a "Flash Text" sync message from the console, it sets a flash text field for the lot to that flash text message and generates a new status message to the clients. If the DLA auction server receives a "Jump Lot" sync message from the console, it sets a lot cursor to the new lot and generates a new status message to the clients. These various types of sync messages are handled by the routine "sync," called in step 1816. That routine essentially maintains the correspondence between the computational image of live auctions stored in the DLA database and the live auctions via the incoming sync messages from the DLA auction console, and generates status messages, when necessary, to update the auction status screen displayed to remote bidders.

If the DLA auction server program receives an end of auction message from an DLA auction console program, as detected in step 1818, the DLA auction server program removes the indicated auction ID from the list of active auction IDs sends an end of auction message to all root-level collector/redistributor nodes in step 1820, and then resumes waiting for another event. If the DLA auction server program receives a termination indication as detected in step 1820, then the DLA auction server program terminates, in step 1822. Otherwise, the DLA auction server resumes waiting for another event.

Figure 19:
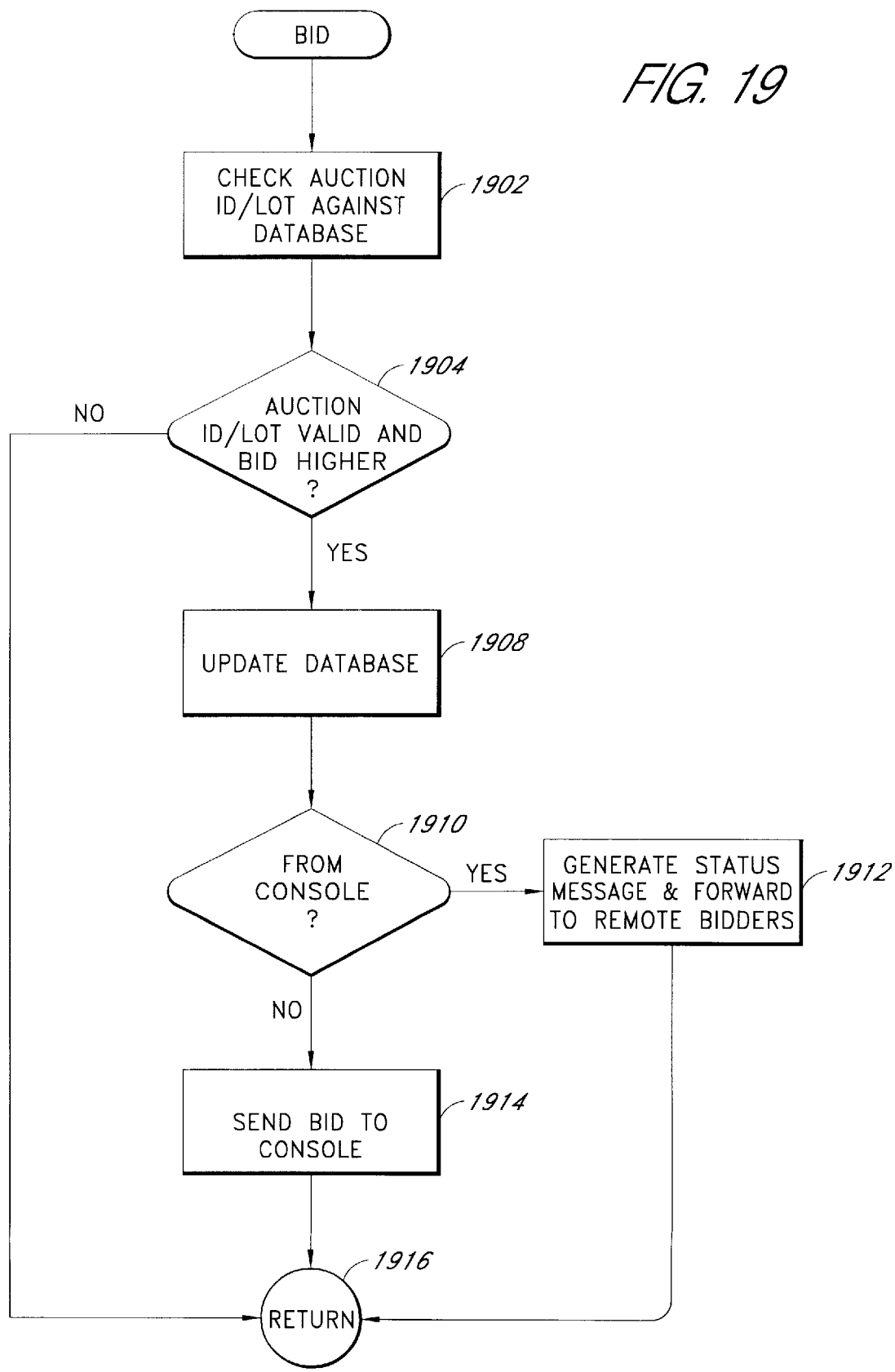
FIG. 19 is flow control program diagram of the routine "bid."

FIG. 19 is flow control program diagram of the routine "bid." This routine is called by the DLA auction server program in step 1808 in FIG. 18. In step 1902, the DLA auction server program checks the auction ID and lot numbers in the bid against the DLA database to make sure the bid is still valid. If the bid is not valid, as detected in step 1904, the routine "bid" returns in step 1906. Otherwise, the DLA auction server program may update the database in step 1908 in order to facilitate filtering of other received bids. If the bid is received in from the DLA auction console, as detected by the routine "bid" in step 1910, then, in step 1912, the routine "bid" generates a status message to send to the remote bidders in order to update the remote bidders' auction status displays. If, on the other hand, the bid is received from a remote bidder, the DLA auction server forwards the bid to the appropriate DLA auction console program in step 1914.

Figure 20:
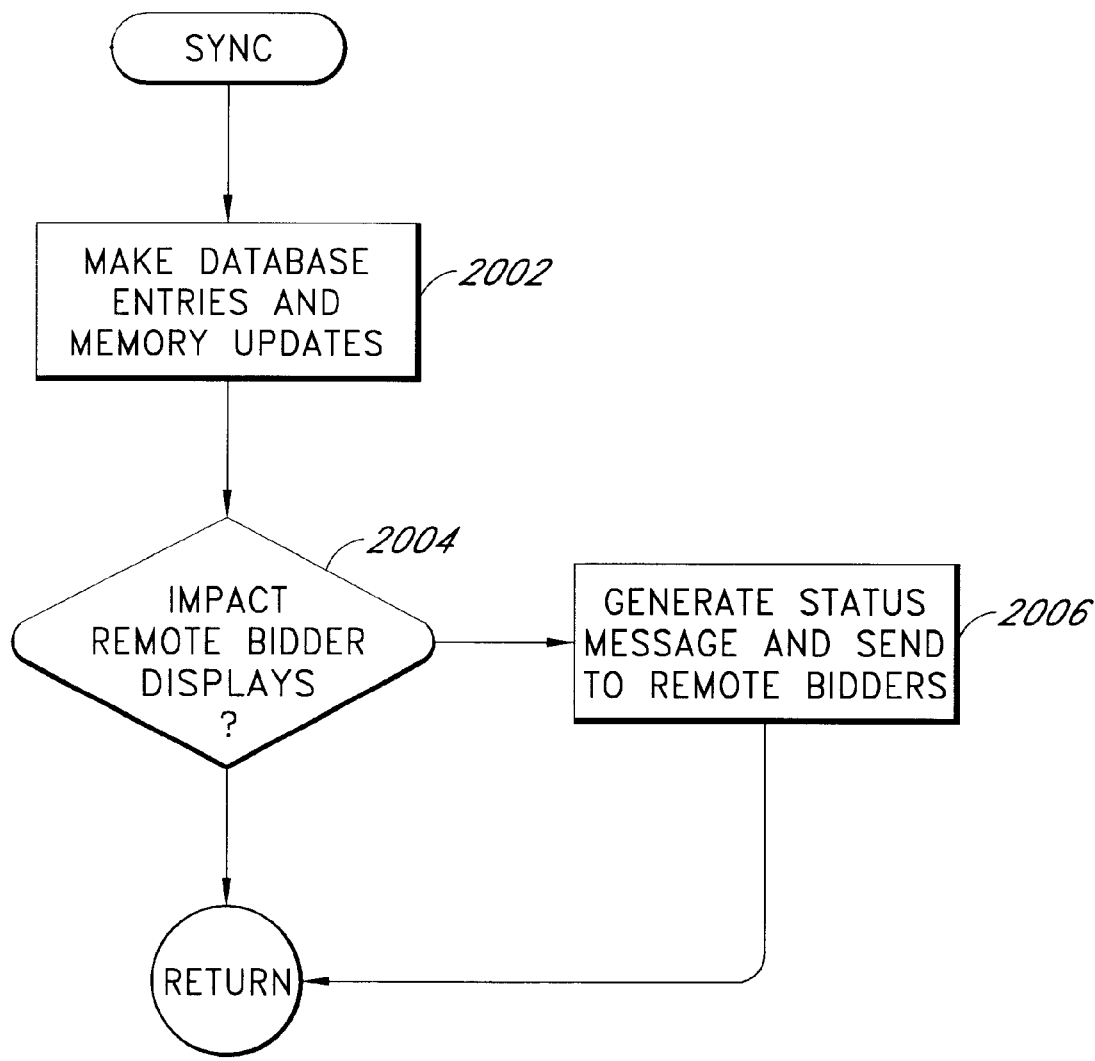
FIG. 20 is a flow control program diagram of the routine "sync."

FIG. 20 is a flow control program diagram of the routine "sync." The routine "sync" is called by the DLA auction server in step 1816 in FIG. 18. In step 2002, the DLA auction server updates in-memory structures and database entries in order to ensure that the computational representation of the live auction from which the sync message is sent corresponds to the state of the live auction.. If the sync message describes a state change that must be passed on to remote bidders for display by the DLA client program, then the routine "sync" generates a corresponding status message and forwards it to the root-level collector/redistributor nodes in step 2006. The various sync messages include: (1) "AskIncrement," a message that sets the asking price and the ask increment; (2) "Console State," a message that contains one of the following states: "fair warning," "last chance," "sold," "sold on the floor," "pass," "next item;"; (3) "Flash Text," a message used to convey textual messages representing the auctioneer's comments; and (4) "Lot Sequencer," a message that represents a re-sequencing of lots.

Figure 21:
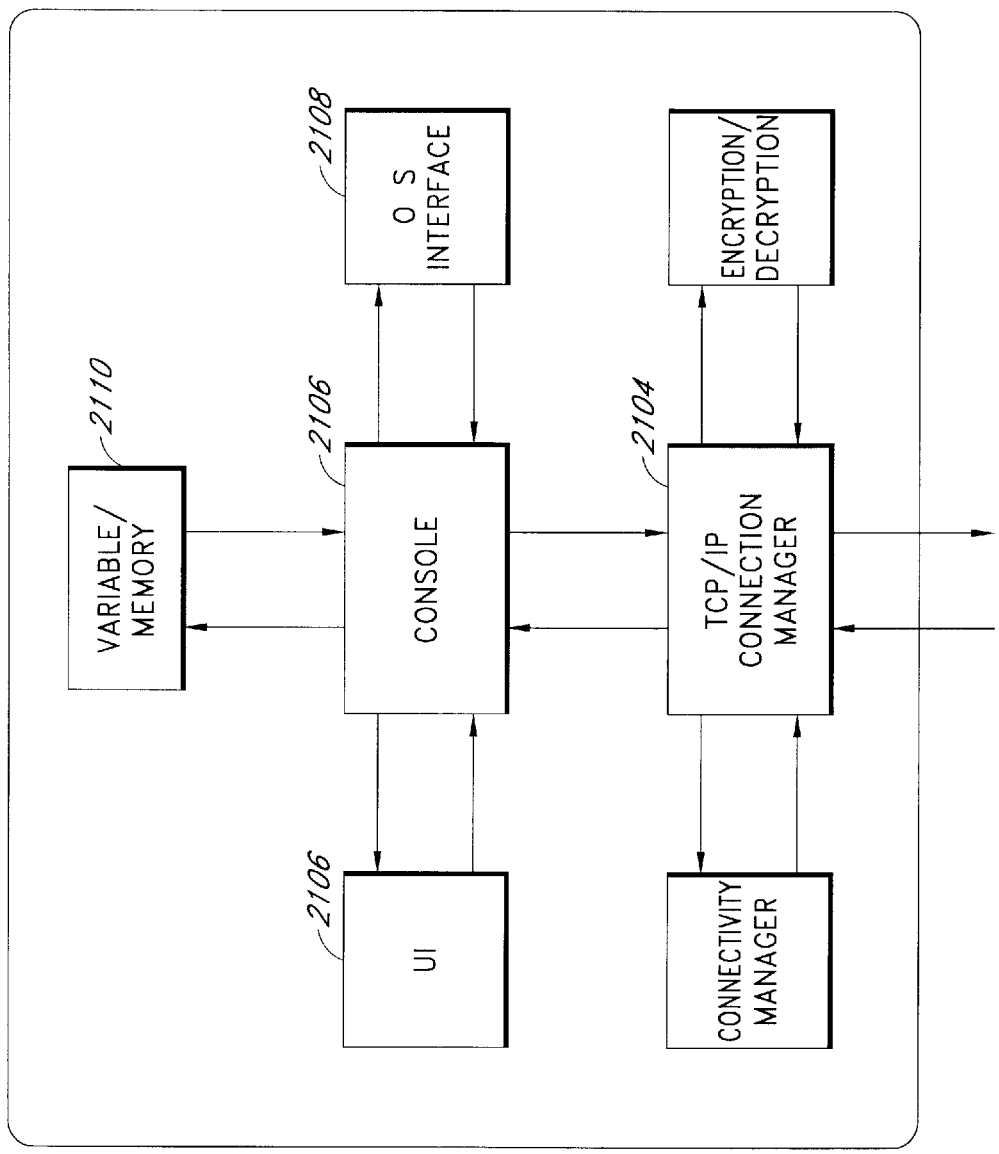
FIG. 21 is a block diagram of the DLA auction console program.

FIG. 21 is a block diagram of the DLA auction console program. The DLA auction console program components are nearly identical to the components with the DLA client program, described above with reference to FIG. 12. The only substantive differences are that the TCP/IP connection manager 2104 receives messages from the DLA auction server program and sends messages to the DLA auction server program and that the console module 2106 interconnects the TCP/IP connection manager module 2104, the user interface module 2106, the OS interface component 2108, and the memory component 2110 in order to implement the functionalities provided by the DLA auction console.

Figure 22:
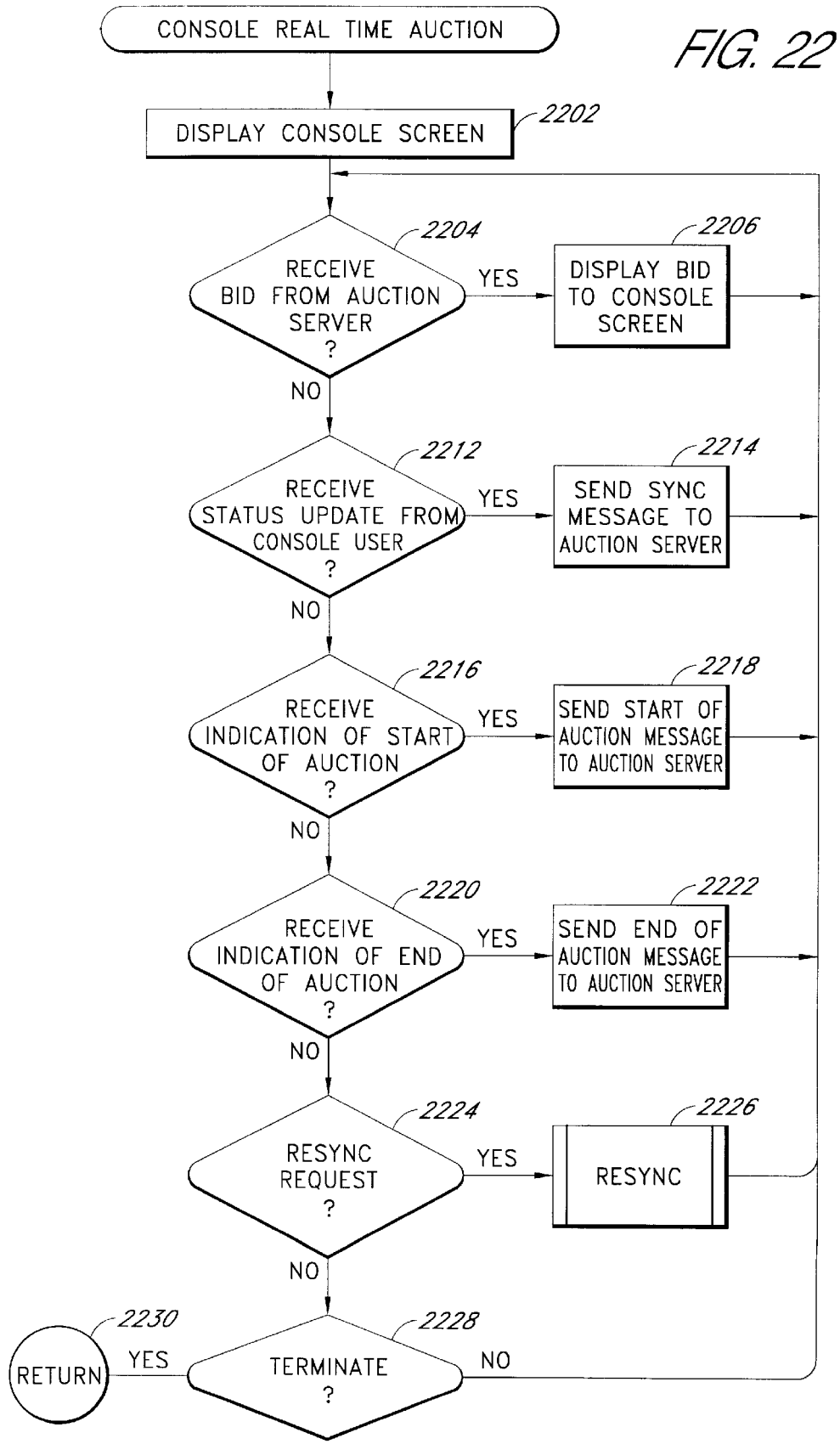
FIG. 22 is a flow control diagram in that portion of the DLA auction console program concerned with facilitating a live auction.

FIG. 22 is a flow control diagram of that portion of the DLA auction console program concerned with facilitating a live auction. In step 2202, the DLA auction console program displays the DLA console screen to the DLA human proxy. Then, the DLA auction console program waits for any number of different events to occur and then handles those events. If the DLA auction console program receives a bid from the DLA auction server, as detected in step 2204, the DLA auction console program displays the bid to the console screen in step 2206 and resumes waiting for another event. If the DLA auction console program receives a status update input from the console screen, as detected in step 2212, the DLA auction console program sends a corresponding sync message to the DLA auction server in step 2214 and resumes waiting for another event. If the DLA auction console program receives an indication from the console screen of the start of an auction, as detected in step 2216, the DLA auction console program sends a start of auction message to the auction server, in step 2218 and then resumes waiting for another event. If the DLA auction console program receives an indication of the end of an auction, as detected in step 2220, the DLA auction console program sends an end of auction message to the DLA auction server program in step 2222 and resumes waiting for another event. If the DLA auction console program receives a resync request from the DLA auction server, as detected in step 2224, then the DLA auction console program calls a "resync" routine to undertake and complete a resync dialog with the DLA auction server program in step 2226. The resync routine facilitates an exchange of sync messages, and will not be discussed further. If the DLA auction console program receives a termination indication, as detected in step 2228, the DLA auction console program terminates in step 2230. Otherwise, the DLA auction console program resumes waiting for another event.

Although the present invention has been described in terms of preferred embodiments, it is not intended that the invention be limited to these embodiments. Modifications within the spirit of the invention will be apparent to those skilled in the art. For example, different numbers and types of basic components may be employed to implement the DLA system. Software components may be implemented in many different languages to run on different types of computers that provide different operating system interfaces. Many different types of databases and data schemas can be employed to implement the DLA database to which the DLA auction server interfaces, as well as the client validation databases used by the first-line collector/redistributor nodes. Different types of graphical user displays may be employed to interface with remote bidders and DLA human proxies, and different orderings of transaction steps may be supported. In the future, data transmission media other then the Internet may be used to interconnect the remote bidders to the DLA system and interconnect the DLA auction consoles with the DLA auction server. Already, much higher-bandwidth communications media have been designed and planned for. In addition, the remote bidders may interact with a communications device other than a remote computer, including Internet-enhanced, interactive cable television or even more capable and technologically advanced devices. Ultimately, the auction console may be integrated more closely with the auction process, perhaps displayed to the auctioneer and directly controlled by the auctioneer. Alternatively, the auction console may eventually have the capability of monitoring the auction process itself, without the need for a human proxy.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents:

1. A system for allowing remote bidders to participate by computer in a live auction conducted by a human auctioneer in the presence of on-site bidders, the system comprising:
   an auction console program which runs on a computer at a site of the auction, the auction console program providing an interface for a human proxy to communicate with the remote bidders in real time about the live auction, the interface providing functionality for the human proxy to receive bids from the remote bidders for communication to the auctioneer, and further providing functionality for the human proxy to enter information about a current state of the auction, including information about successful bids from on-site bidders;
   an auction server which communicates with the console program and with computers of the remote bidders, the auction server programmed to maintain a real time auction state which reflects the information entered by the human proxy and bids submitted by the remote bidders, the auction server further programmed to communicate information about the real time auction state to the remote bidders to allow the remote bidders to monitor the auction in real time; and
   a plurality of physical network nodes coupled between the auction server and the computers of the remote bidders, the nodes programmed to pass the real time auction state information from the auction server to the remote bidders, and programmed to pass bid messages from the remote bidders to the auction server for processing;
   wherein at least some of the plurality of nodes are further programmed to filter bid messages from the remote bidders based on auction state information received from the auction server, to thereby prevent at least some of the bid messages that represent invalid bids from unnecessarily being passed to the auction server.

2. The system as in claim 1, wherein the plurality of nodes include multiple leaf nodes, each leaf node being programmed to maintain connections with a respective subset of the remote bidders.

3. The system as in claim 2, wherein the plurality of nodes are coupled to the auction server to form a tree structure.

4. The system as in claim 1, wherein at least some of the nodes are programmed to block bid messages based on comparisons of bid amounts of the bid messages to a current high bid.

5. The system as in claim 1, wherein at least some of the nodes are programmed to block bid messages that do not correspond to a currently valid auction.

6. The system as in claim 1, wherein at least some of the nodes are programmed to block bid messages that do not correspond to a currently valid lot.

7. The system as in claim 1, wherein at least some of the nodes are programmed to block a request by a user to connect to a current auction when the user is not authorized to participate in the current auction.

8. The system as in claim 1, wherein the auction console program includes user interface functions for the human proxy to select predetermined auction status messages to broadcast to the remote bidders.

9. The system as in claim 1, wherein the auction console program comprises an applet which runs within a web browser program.

10. The system as in claim 1, further comprising a client program that is adapted to be used by the remote bidders, the client program configured to encapsulate a bid submission from a remote bidder for transmission to the auction server, and to display real time auction status information to the remote bidder.

11. The system as in claim 1, wherein the auction server comprises a database which stores state information for multiple auctions concurrently, including auctions occurring in different locations.

* * * * *